US012400533B1

(12) United States Patent
Scalisi et al.

(10) Patent No.: US 12,400,533 B1
(45) Date of Patent: Aug. 26, 2025

(54) ACTIVE DETERRENT PLATFORM

(71) Applicant: ShieldSOS LLC, Austin, TX (US)

(72) Inventors: Joseph Frank Scalisi, Austin, TX (US); Adrian Lanch, Austin, TX (US); Marco A. Mayor, Boynton Beach, FL (US); Richard Perry, Alpine, UT (US)

(73) Assignee: SHIELDSOS, LLC, Austin, TX (US)

( * ) Notice: Subject to any disclaimer, the term of this patent is extended or adjusted under 35 U.S.C. 154(b) by 0 days.

(21) Appl. No.: 19/009,686

(22) Filed: Jan. 3, 2025

Related U.S. Application Data

(60) Provisional application No. 63/570,375, filed on Mar. 27, 2024.

(51) Int. Cl.
*G08B 15/02* (2006.01)
*A01M 29/12* (2011.01)

(52) U.S. Cl.
CPC .............. *G08B 15/02* (2013.01); *A01M 29/12* (2013.01)

(58) Field of Classification Search
CPC ...... G08B 15/02; G08B 15/00; G08B 15/001; E05G 1/12; A01M 29/12; A01M 29/10; A01M 20/14
USPC .......................................................... 109/29
See application file for complete search history.

(56) References Cited

U.S. PATENT DOCUMENTS

| | | | | |
|---|---|---|---|---|
| 3,929,259 A * | 12/1975 | Fegley | G08B 15/02 | 222/61 |
| 3,930,597 A * | 1/1976 | Fegley | G08B 15/02 | 222/83.5 |
| 4,841,752 A * | 6/1989 | Fletcher | E05G 1/12 | 109/20 |
| 4,867,076 A * | 9/1989 | Marcone | G08B 15/02 | 109/20 |
| 5,819,124 A * | 10/1998 | Somner | G08B 13/19695 | 396/301 |
| 10,665,074 B1 * | 5/2020 | Kausek | B05B 3/021 | |
| 11,308,782 B1 * | 4/2022 | Stevens | G08B 7/06 | |
| 2006/0086348 A1 * | 4/2006 | Song | G08B 15/007 | 124/56 |
| 2008/0231705 A1 * | 9/2008 | Keller | G08B 13/19634 | 348/154 |
| 2010/0128123 A1 * | 5/2010 | DiPoala | G08B 13/19619 | 340/541 |
| 2011/0279270 A1 * | 11/2011 | Marckwald | G08B 25/10 | 340/541 |
| 2013/0106605 A1 * | 5/2013 | Mullins | G08B 27/003 | 340/541 |
| 2015/0027178 A1 * | 1/2015 | Scalisi | E05B 47/026 | 292/144 |
| 2015/0065167 A1 * | 3/2015 | Scalisi | G01S 19/48 | 455/456.1 |
| 2020/0143644 A1 * | 5/2020 | Scalisi | G08B 13/19619 | |
| 2020/0336331 A1 * | 10/2020 | Scalisi | H04M 11/04 | |

(Continued)

*Primary Examiner* — Suzanne L Barrett
(74) *Attorney, Agent, or Firm* — Gallium Law; Jacob Panangat; Justin Schwechter

(57) ABSTRACT

Included in the present disclosure is a device, including a housing configured to detachably couple to a surface of a building, the housing including an interior portion therewithin. In some embodiments, the device includes a container housed within the interior portion of the housing, the container containing contents therewithin. According to some embodiments, the device is configured to discharge the contents from within the container to an area exterior to the housing.

17 Claims, 15 Drawing Sheets

(56) References Cited

U.S. PATENT DOCUMENTS

2022/0006889 A1* 1/2022 Scalisi .................. H04N 7/188
2022/0057519 A1* 2/2022 Goldstein ............... G01S 17/88

* cited by examiner

ACTIVE DETERRENT PLATFORM

CROSS-REFERENCE TO RELATED APPLICATIONS

The entire contents of the following application are incorporated herein: U.S. Provisional Patent Application No. 63/570,375; filed Mar. 27, 2024; and entitled ACTIVE DETERRENT PLATFORM.

FIELD OF TECHNOLOGY

The present disclosure relates to home security devices. Specifically, the present disclosure relates to deterrence devices and methods.

BACKGROUND

Home deterrence devices have a rich history dating back centuries, evolving from basic security measures to sophisticated technological solutions. Current smart home technology can often allow homeowners to control security systems remotely through smartphones and computers. These systems integrate various components such as cameras, motion detectors, door/window sensors, and smart locks, providing comprehensive security solutions.

However, current deterrent devices have deficiencies that the present disclosure seeks to remedy.

SUMMARY

Included in the present disclosure is a device, including a housing configured to detachably couple to a surface of a building, the housing including an interior portion therewithin. In some embodiments, the device includes a container housed within the interior portion of the housing, the container containing contents therewithin. According to some embodiments, the device is configured to discharge the contents from within the container to an area exterior to the housing.

The device may be configured to discharge the contents to the area via an opening in the housing. In some embodiments, the device further includes an actuator configured to discharge the contents from within the container to the opening of the housing via an aperture of the container.

According to some embodiments, the actuator is configured to interact with the container mechanically, electrically, or both, to discharge the contents from within the container. The device may further include a motor configured to move the actuator to enable mechanical interaction between the actuator and the container. In some embodiments, the aperture of the container is aligned with the opening of the housing.

According to some embodiments, the container further comprises a container body defining a reservoir therewithin containing the contents. The reservoir may have a capacity from about 1 ounce (oz) to about 40 oz. In some embodiments, the container further includes a nozzle extending to the opening of the housing, the nozzle having an outlet opening aligned with the opening of the housing, such that the contents are configured to pass through the nozzle from the reservoir to the opening of the housing. According to some embodiments, the aperture is disposed on the container body and spaced from the opening of the housing, such that the nozzle extends substantially between the aperture and the opening of the housing. The nozzle may include the aperture. In some embodiments, the outlet opening of the nozzle is the aperture.

According to some embodiments, the device further includes a valve stem fluidly coupled with the aperture, wherein the valve stem, the container body, or both, is configured to move between a first position and a second position, wherein in the first position the reservoir is fluidly isolated from the opening of the housing, wherein in the second position the valve stem fluidly couples the reservoir with the opening of the housing. The valve stem, the container body, or both, may move between the first and second positions via the interaction between the actuator and the container.

In some embodiments, the container further includes a cap mechanically coupled to the container body, the valve stem at least partially disposed within the cap, the container body, or both. According to some embodiments, the actuator is configured to move the container body towards the cap so as to move the container body from the first position to the second position, thereby fluidly coupling the reservoir with the opening of the housing. The container may further include a lever mechanically coupled to the container body, wherein the actuator is configured to move the lever toward the container body so as to move the valve stem from the first position to the second position, thereby fluidly coupling the reservoir with the opening of the housing.

In some embodiments, the container is pressurized. According to some embodiments, a pressure within the container is from about 25 pounds per square inch (PSI) to about 200 PSI. The device may further include a pump coupled to the container and configured to dispense contents from the container.

The device may further include a heating plate configured to maintain a temperature of i) the contents within the container, ii) the interior portion of the housing, or both. In some embodiments, the heating plate includes a metal oxide semiconductor (MOS) heater, a flat plate collector (FPC) heating plate, or both. According to some embodiments, the temperature is maintained above about $-10°$ C., $-5°$ C., $0°$ C., or $5°$ C. The heating plate may be limited to less than $50°$ C. The device may include a heating pad, either alone or in combination with the heating plates as detailed above.

In some embodiments, the contents are configured to irritate a sensory organ of an individual. According to some embodiments, the contents comprise a chemical composition. The chemical composition may include capsaicin. In some embodiments, the chemical composition is approximately two million Scoville heat units (SHUS).

According to some embodiments, the chemical composition is configured to aerosolize upon egressing the aperture, the opening of the housing, or both. The aerosolized chemical composition may be configured to remain in the area for a predetermined amount of time. In some embodiments, the predetermined amount of time is from approximately zero minutes to approximately thirty minutes. According to some embodiments, the area is approximately fifteen hundred square feet. The aerosolized chemical composition may be configured to degrade after the predetermined amount of time. In some embodiments, the degradation comprises a removal of an irritant to a sensory organ from the area.

According to some embodiments, the housing includes a cover and a base detachably coupled to the cover, the cover and the base substantially enclosing the interior portion of the housing. The opening of the housing may be disposed on the cover. In some embodiments, the base is configured to detachably couple to the surface of the building, such that the cover is configured to be removable from the base while the base remains coupled to the surface of the building.

According to some embodiments, the surface is selected from the group consisting of a ceiling of the building, a roof of the building, an exterior wall of the building, an interior wall of the building, and combinations thereof. The container may be removable from the housing. In some embodiments, the container is refillable.

According to some embodiments, the device further includes a printed circuit board (PCB) housed within the interior portion of the housing. The PCB may be electrically coupled, communicatively coupled, or both, with the actuator, the motor, or both, such that discharge of the contents from within the container via interaction between the actuator and the container is based on instructions received via the PCB.

In some embodiments, the device further includes a light emitting diode (LED) electrically coupled, communicatively coupled, or both to the PCB, the LED configured to emit a light visible from an exterior of the housing. According to some embodiments, the LED is configured to pulse. The LED may be a first LED, the device further including a second LED.

In some embodiments, the device further includes a speaker electrically coupled, communicatively coupled, or both to the PCB, the speaker configured to emit a noise audible from the exterior of the housing. According to some embodiments, the noise is selected from the group consisting of a siren, a message, and combinations thereof.

The device may further include a camera electrically coupled, communicatively coupled, or both to the PCB, the camera configured to capture an image or video of a location exterior to the housing. In some embodiments, the device further includes a motion detector electrically coupled, communicatively coupled, or both to the PCB, the motion detector configured to capture a movement exterior to the housing. According to some embodiments, the device further includes a microphone electrically coupled, communicatively coupled, or both to the PCB, the microphone configured to capture a sound exterior to the housing. The device may include any combination of these features.

The PCB may be configured to control an action selected from the group consisting of emitting the light from the LED, emitting the noise from the speaker, releasing the contents from the container, capturing the image or video of the location exterior to the housing, capturing the movement exterior to the housing, capture the sound exterior to the housing, and combinations thereof.

In some embodiments, the action is a first action, the PCB further configured to control a second action. According to some embodiments, the PCB is configured to control a sequential order of the first action and the second action. The PCB may be configured to control a delay between the first action and the second action.

In some embodiments, the PCB is configured to control a duration of the action. According to some embodiments, the action is releasing the contents from the container, the duration lasting until the container is approximately empty. The duration may be approximately three seconds. The duration may be greater than three seconds.

In some embodiments, the device further includes a power supply coupled to a component selected from the group consisting of the actuator, the motor, the PCB, the LED, the speaker, the camera, the microphone, the motion detector, and combinations thereof. According to some embodiments, the power supply is sized and configured to fit inside the interior portion of the housing. The power supply may be a battery. In some embodiments, the battery is a lithium-ion battery.

According to some embodiments, the power supply is configured to couple to an external outlet. The device may further include a power indicator. In some embodiments, the power indicator is configured to indicate a power state of the power supply.

According to some embodiments, the device is further configured to communicate with an external component. The external component may include a remote computing device. In some embodiments, the remote computing device comprises a device selected from the group consisting of a smart device, a tablet computer, a personal assistant, a distributed network of servers, and combinations thereof.

According to some embodiments, the remote computing device is configured to provide instructions for the PCB to control an action, such as those detailed above. The remote computing device may be configured to provide instructions to discharge the contents from within the container to the area exterior of the housing.

In some embodiments, the external component includes a doorbell. According to some embodiments, the external component includes another device of a same type. The device may be configured to communicate with the external component via a wired connection. In some embodiments, the device is configured to communicate with the external component via a wireless connection.

Also included in the present disclosure is a system, including a device, such as those detailed above. In some embodiments, the system includes an external component, such as those detailed above, the external component communicatively coupled to the device.

According to some embodiments, external component is configured to receive an alert from the device, such that the external component is configured to activate a deterrence measure via the device. The deterrence measure may be i) discharging the contents from within the container to the are exterior to the housing, ii) emitting light from the LED, ii) emitting noise from the speaker, ii) capturing image via the camera, or iv) any combination thereof. In some embodiments, the deterrence measure includes discharging the contents from within the container to the area exterior to the housing.

According to some embodiments, the alert includes light being emitted from the LED, sound received by the microphone, movement captured by the motion detector, image captured by the camera, or any combination thereof. The external component may be configured to automatically activate the deterrence measure.

In some embodiments, the external component is configured to activate the deterrence measure based on a user input. According to some embodiments, the external component includes a casing configured to detachably couple to the surface of the building or a different surface of the building.

The device may be a first device, and the system may further include a second device. In some embodiments, the external component is communicatively coupled to each of the first device and the second device. According to some embodiments, the external component is configured to independently control, simultaneously control, or both, an action for each of the first device and the second device.

The external component may further include a screen. In some embodiments, the screen is configured to provide information to a user. According to some embodiments, the information includes a status of each device communicatively coupled with the external component. The status may relate to i) the container and contents therewithin for each device, ii) the power supply for each device, iii) connectivity of each device, or iv) any combination thereof.

In some embodiments, the information is selected from the group consisting of an image taken by the camera, a video taken by the camera, a motion detected by the motion detector, and combinations thereof.

According to some embodiments, the screen is configured to receive the user input. The user input may include pressing the screen for a predetermined duration to activate a deterrence measure. In some embodiments, the user input includes i) selectively activating the deterrence measure for any device communicatively coupled with the external component, ii) activating the deterrence measure for all devices communicatively coupled with the external component, or iii) both.

In some embodiments, the system further includes a computational module communicatively coupled to the external component, the LED, the speaker, the actuator, the motor, the camera, the microphone, or any combination thereof. According to some embodiments, the computational module comprises a machine learning algorithm configured to determine a future output by the external component based on a previous output by the external component in response to a categorized alert, wherein the categorized alert is an alert classified according to an identifying parameter.

The future output, previous output, or both, may include the activation of a deterrence measure by the device. In some embodiments, for a categorized alert relating to the image captured by the camera, the identifying parameter includes i) a threshold level of a number of persons present in the image, ii) facial features, such that the computational module is configured to determine the future output via facial recognition, iii) a type of animal, iv) a weapon, or v) any combination thereof.

According to some embodiments, for a categorized alert relating to the motion captured by the motion detector, the identifying parameter comprises motion during a specified time. For a categorized alert relating to the sound captured by the microphone, the identifying parameter may be i) a threshold level of a number of different individuals present in the captured sound, ii) vocal features, such that the computational module is configured to determine the future output via vocal recognition, iii) a sound associated with a type of animal, iv) a sound associated with a weapon, or v) any combination thereof.

In some embodiments, the computational module associates each categorized alert according to a threat level. According to some embodiments, the computational module is located remote to the device, the external component, or both. The computational module may be disposed within the device or the external component.

BRIEF DESCRIPTION OF DRAWINGS

These and other features, aspects, and advantages are described below with reference to the drawings, which are intended to illustrate, but not to limit, the invention. In the drawings, like characters denote corresponding features consistently throughout similar embodiments.

DETAILED DESCRIPTION OF THE INVENTION

Disclosed herein, in some aspects, is a deterrence device configured to disperse contents that may be used to deter a living being (e.g., individual person, and/or an animal) from further encroaching about a given area. The contents may include a composition that irritates a sensory organ of the living being. The deterrence device may store the contents within a container, located within a housing of the device.

The deterrence device may be a part of a deterrence system that includes an external component (e.g., a remote computing device) that is communicatively coupled to the deterrence device, and in some cases, is remote from the deterrence device. The external component may be configured to provide instructions to the deterrence device, including discharging the contents from the device, thereby causing the contents to disperse about an area surrounding the device. The device may include one or more additional components, including for example, a camera, motion detector, a microphone, a speaker, or any combination thereof. The device may be configured to send an alert from any of the one or more additional components to the external component, which, in some cases will prompt a user to activate discharge of the contents from the device.

Figure 1:
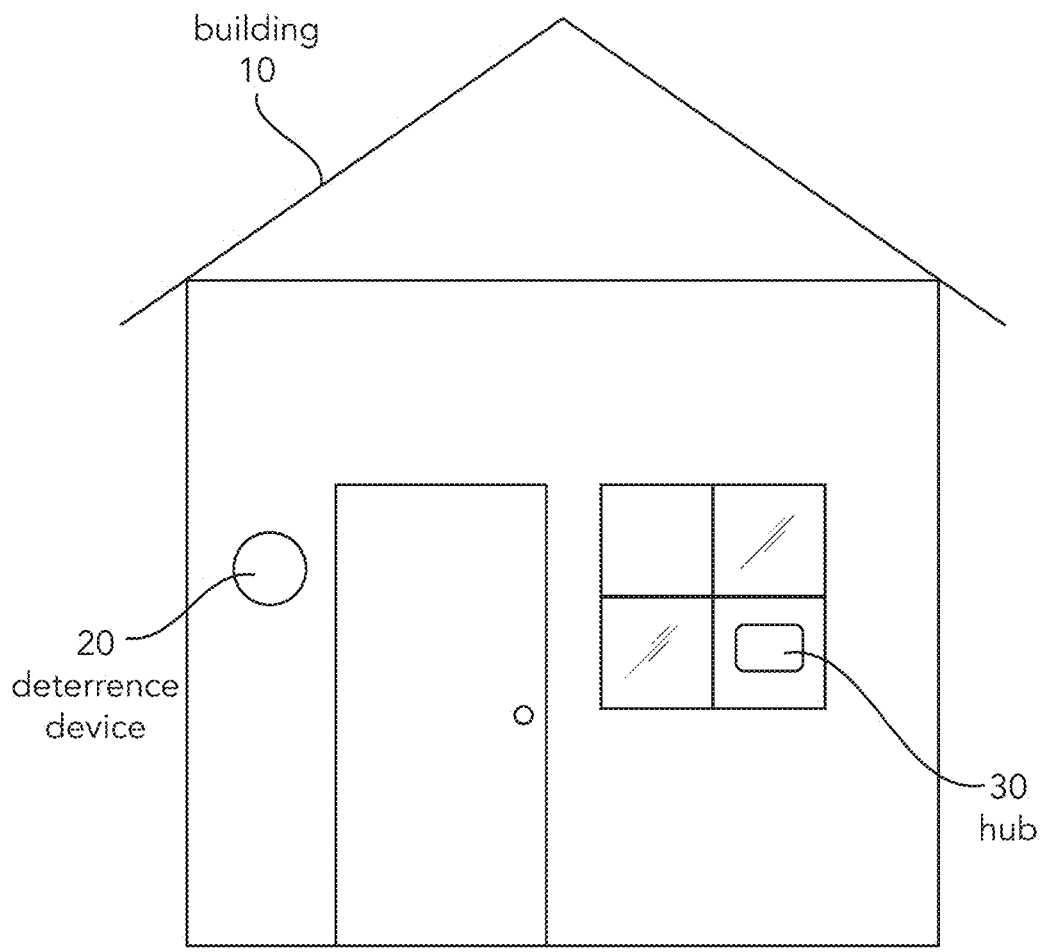
FIG. 1 illustrates a front view of a building including a deterrence system, according to some embodiments.

FIG. 1 illustrates a front view of building 10 including a deterrence system, according to some embodiments. As shown in FIG. 1, a deterrence device 20 may be present on an external surface of the building 10. In this embodiment, the deterrence device 20 is shown next to the front door of the building 10, which may be useful when using the deterrence device 20 in tandem with a smart doorbell capable of communicating with the deterrence device 20. In additional or alternative embodiments, the deterrence device may be placed on any walls of the building 10, the roof of the building 10, and/or even an interior surface of the building 10.

Through the window of the building 10, an external component (hub) 30 is shown. As used herein, the term "external component" and "hub" may be used interchangeably. In some embodiments, this hub 30 is placed on an internal surface of the building 10. In additional or alternative embodiments, the hub 30 may be placed on an external surface of the building 10, or not placed on any surface of the building 10, and used as a standalone device which may include a computing device, such as a smart device (e.g., smartphone, smartwatch, tablet, etc).

Figure 2:
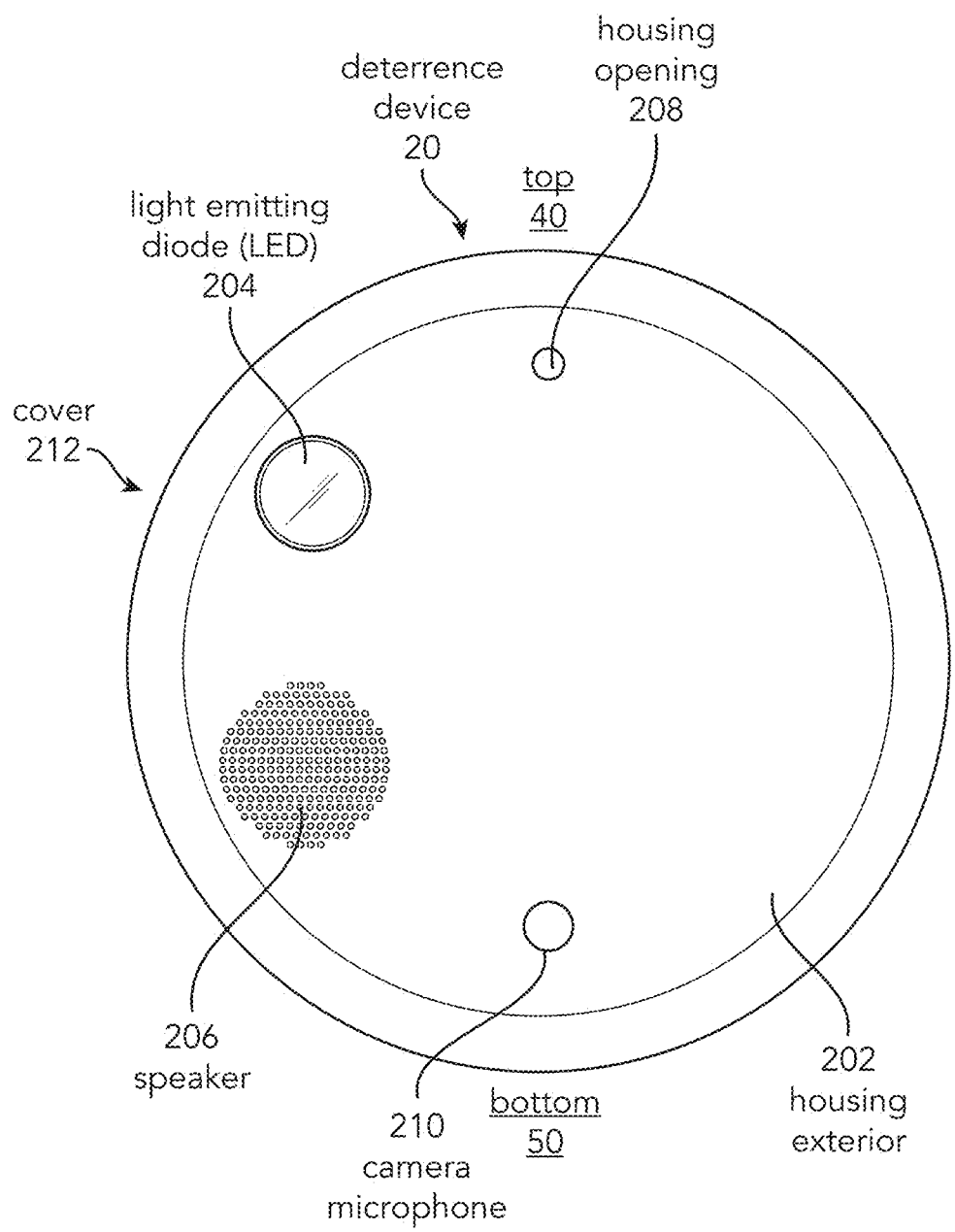
FIG. 2 illustrates a front view of a deterrence device, according to some embodiments.

FIG. 2 illustrates a front view of a deterrence device 20, according to some embodiments. As can be seen in FIG. 2, the deterrence device 20 may include a housing having a housing exterior 202. In some embodiments, the deterrence device 20 includes at least one light-emitting diode (LED) 204. The LED 204 may include a color. According to some embodiments, the LED 204 is a multicolored LED, capable of changing colors, or having the color output controlled, either via a controller or a user. In additional or alternative embodiments, more than one LED 204 may be present, and these LEDs may be monochromatic, multicolored, or a combination of these options.

To this extent, colors may be used to convey different information (e.g., warnings, activation of the device, etc.). The colors may also be used for psychological effect. For example, the colors red and blue may be chosen in order to replicate police lights, causing a deterring effect on any would-be intruder or other threat. The LED(s) 204 may also flash, or strobe, which may be jarring to a viewer, and further deter them from staying in the area. In any case, the light emitted from such an LED 204 may be clearly visible from exterior the deterrence device 20.

Also shown in FIG. 2 is a speaker 206. The speaker 206 may be able to play a loud shrill noise, like a siren, or an undulating sound, similar to a tornado warning. The speaker 206 may also play a message, or act as a speaker for a user of the house in order to tell an intruder to leave, and perhaps warning that further deterrence is to follow should the message not be heeded. According to some embodiments, the siren-like noise coming from the speaker 206 may achieve loudness readings of up to 120 decibels (dB). In some embodiments, the message from the speaker 206 may achieve loudness readings of up to 80 dB, in order to convey a message coherently and loudly. In any case, the sound from the speaker 206 may be clearly audible from exterior the deterrence device 20.

The speaker 206 may also operate as a microphone, permitting two-way communication. The microphone may pick up sounds, and if the sound appears abnormal (either in general, or for a time of day), convey this sound to the user (which may include the resident, or other people inside the house), so that they may choose to make a decision based on the sound.

Figure 6A:
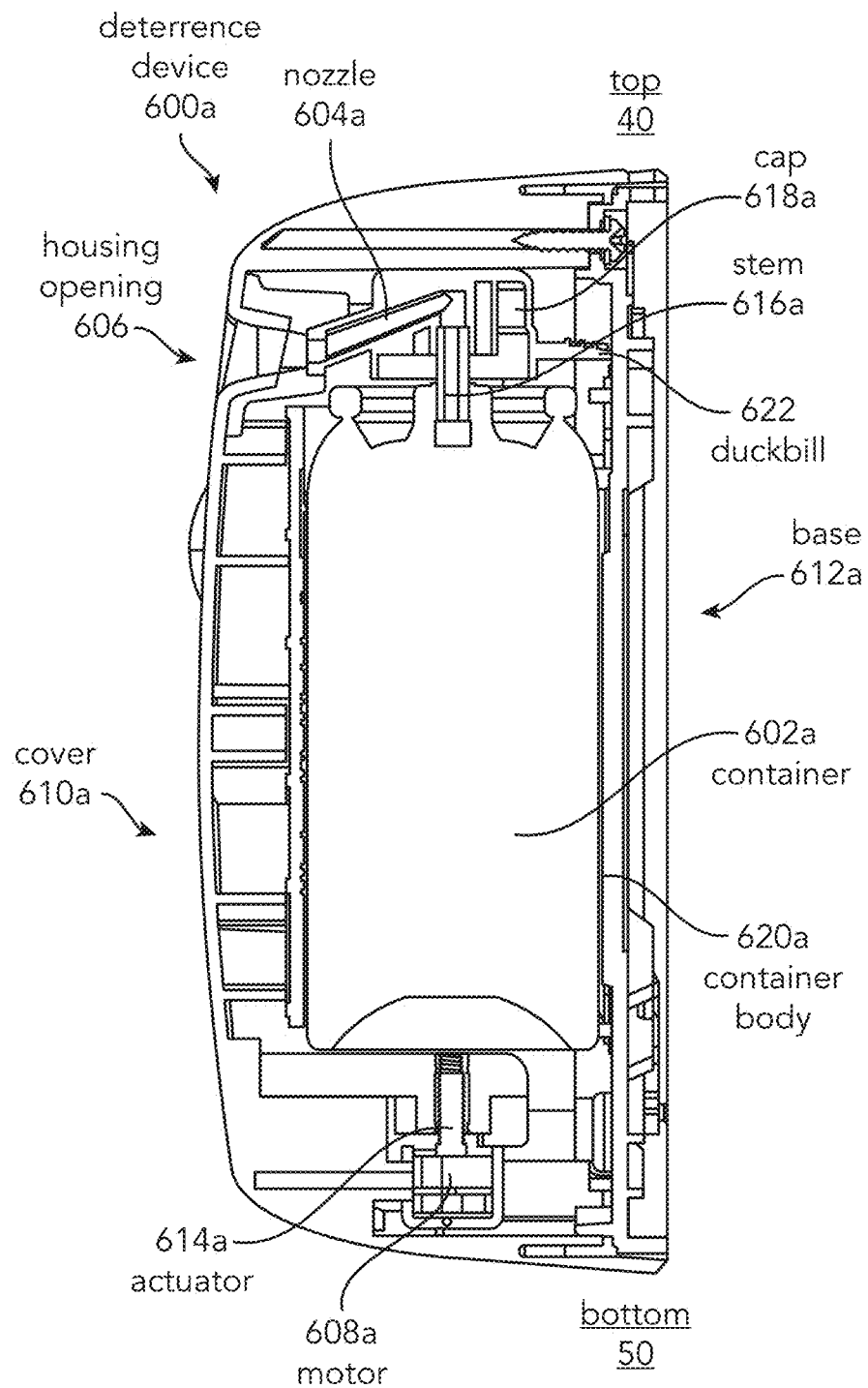
FIG. 6A illustrates a side view of cross-section of a deterrence device, according to some embodiments.
Figure 6B:
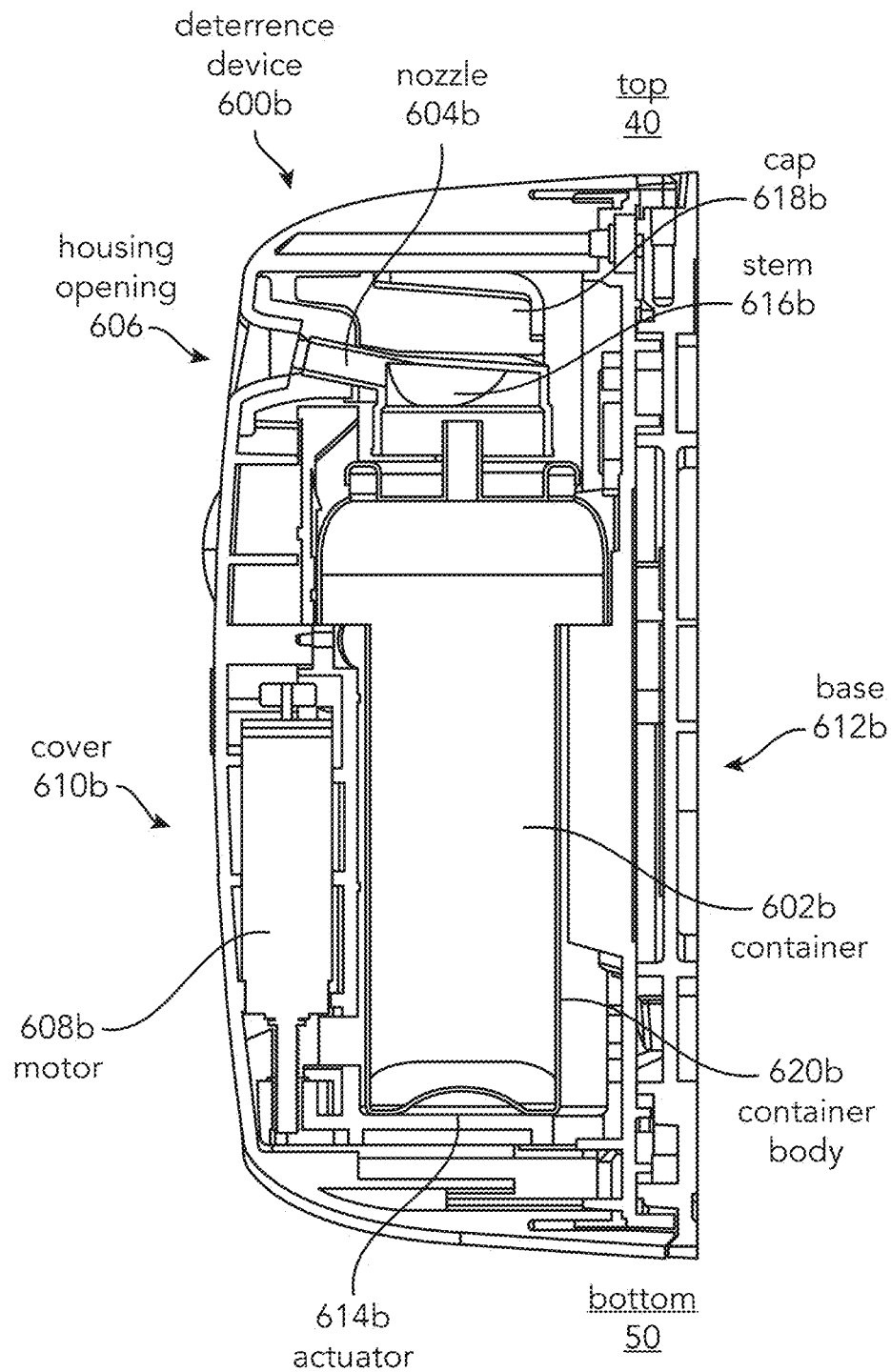
FIG. 6B illustrates an additional side view of a cross-section of a deterrence device, according to some embodiments.

Further shown in FIG. 2 is a housing opening 208. The housing opening 208 may permit the contents of a container stored within the housing to egress the deterrence device 20 (as described herein). FIGS. 4B, 6A, and 6B below detail the fluidic coupling of such a container with a housing opening 208.

Also seen in FIG. 2 is a camera microphone 210. In some embodiments, the camera microphone 210 is only a camera. In additional embodiments, the camera microphone 210 is only a microphone.

In any embodiments where the camera microphone 210 includes a camera, the camera microphone 210 may be capable of capturing images. Additionally or alternatively, the camera microphone 210 may be capable of recording video, or streaming the video directly to a remote device, such as a remote computing device or the external component (hub) (as shown and described in FIG. 7 below).

The camera microphone 210 may be communicatively coupled with a facial recognition database, and capable of conveying information about a passer-by of the device to the user. Additionally or alternatively, the camera microphone 210 may be capable of causing the deterrence device 20 to perform actions, such as emitting noise from the speaker 206, emitting light from the LED 204, or discharging the contents from the housing opening 208, based on identification of the passer-by.

In additional or alternative embodiments, the camera microphone 210 may be communicatively coupled to an animal database, and capable of conveying information about the animal or taking action based on the animal. For example, if a bear were to approach the building on which the deterrence device 20 is located, the camera microphone 210 may cause the deterrence device 20 to take an action to cause the bear to leave the area based on this information from the database.

In additional or alternative embodiments, the camera microphone 210 may be communicatively coupled to an artificial intelligence (AI) capable of registering items on an individual's person. For example, the AI may see that the individual is holding a gun, and not identify the individual as a police officer or service member, and then cause the deterrence device to take action to cause the individual to leave the vicinity.

In some embodiments, the camera microphone 210 is only a microphone. In any embodiment where the camera microphone 210 includes a microphone, the camera microphone 210 may pick up sounds, and if the sound appears abnormal (either in general, or for a time of day), convey this sound to the resident, or other people inside the house, so that they may choose to make a decision based on the sound.

The housing includes a base (not shown, but shown and described in FIGS. 6A and 6B below) and a cover 212 detachably coupled to the base. The base may be coupled to a surface of the housing (as described herein). The housing exterior 202 may form a portion of the cover 212 of the device. The cover 212 and base, when coupled to each other, define an interior portion that is substantially or at least partially enclosed by the cover 212 and base. The device may include one or more internal components, including a container containing the contents that can be discharged, disposed within the interior portion of the housing.

While not shown in FIG. 2, the deterrence device 20 may also include an additional LED that is configured to indicate the power level of a power supply inside or attached to the deterrence device 20. This LED, or power indicator may emit a steady light when the power supply is in a high power state. The LED, or power indicator, may emit a blinking light, change the color of light being emitted, or stop emitting light when the power supply is in a low power state, indicating charging or a new battery is needed.

Additionally, and solely to orient the reader, throughout the current specification a top 40 and a bottom 50 of the deterrence device 20 will be provided. The nature of the deterrence device 20 is such that it may be installed on a surface of a building 10 in any orientation, including on a ceiling, such that the uses of "top" and "bottom" are meaningless. However, with respect to the inner workings of the deterrence device 20, it is useful to have an axis of top 40 and bottom 50 to explain where individual components are located with respect to one another.

Figure 3:
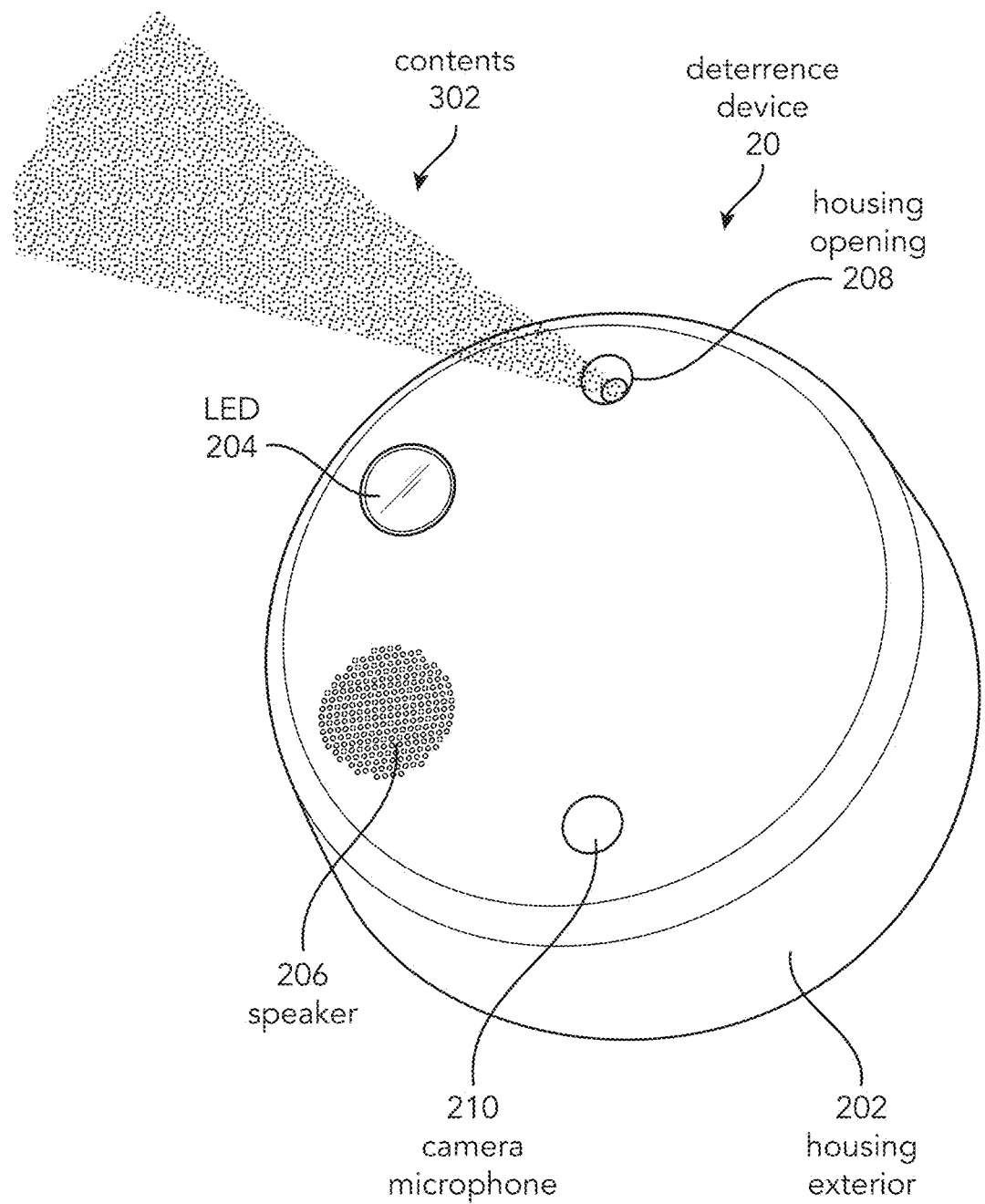
FIG. 3 illustrates a perspective view of the deterrence device of FIG. 2 emitting an aerosol, according to some embodiments.

FIG. 3 illustrates a perspective view of the deterrence device 20 of FIG. 2 discharging contents 302 from within the housing. The contents 302 may be discharged as an aerosol, according to some embodiments. The aerosol may include a chemical composition intended to irritate a sensory organ of an living being, such as a person, animal etc. The contents 302 (e.g., aerosol) may irritate the eyes, lungs, nose, cars, skin, mouth, or any combination thereof, of the living being. In one example, the contents 302 may include or be similar to pepper spray. In some embodiments, the contents 302, once discharged, may be dispersed over an area from about zero to about one hundred square feet, from about one hundred to about five hundred square feet, from about five hundred to about fifteen hundred square feet, from about fifteen hundred to about three thousand square feet, or from about zero to about three thousand square feet.

The contents 302 may linger in the area for between about zero and about five minutes, for between about five and about fifteen minutes, for between about fifteen and about thirty minutes, for between about zero and about thirty minutes before its irritant effect becomes substantially subdued or reduced to having limited effect on the living being. In some embodiments, when the contents' 302 irritant effect becomes substantially subdued or reduced to having limited effect on the living being, it does so without or substantially without leaving behind a residue.

In some embodiments, the chemical composition of the contents 302 includes about ten percent oleoresin capsicum (OC), measuring up to about two million Scoville heat units (SHUS). According to some embodiments, the chemical composition of the contents 302 includes about one and a third percent Capsaicinoids. In additional or alternative embodiments, the contents may include any other type of irritant.

Figure 4A:
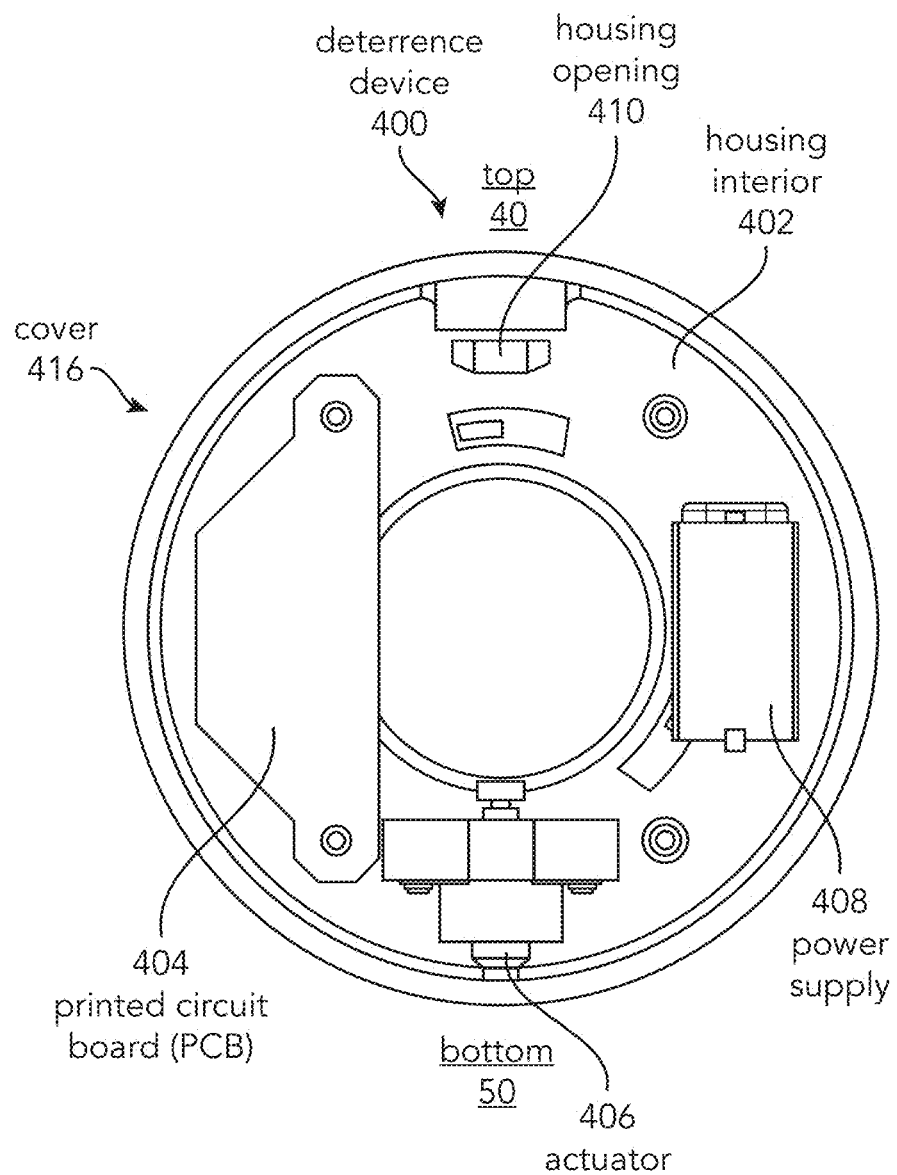
FIG. 4A illustrates a back view of an interior of a deterrence device, according to some embodiments.
Figure 4B:
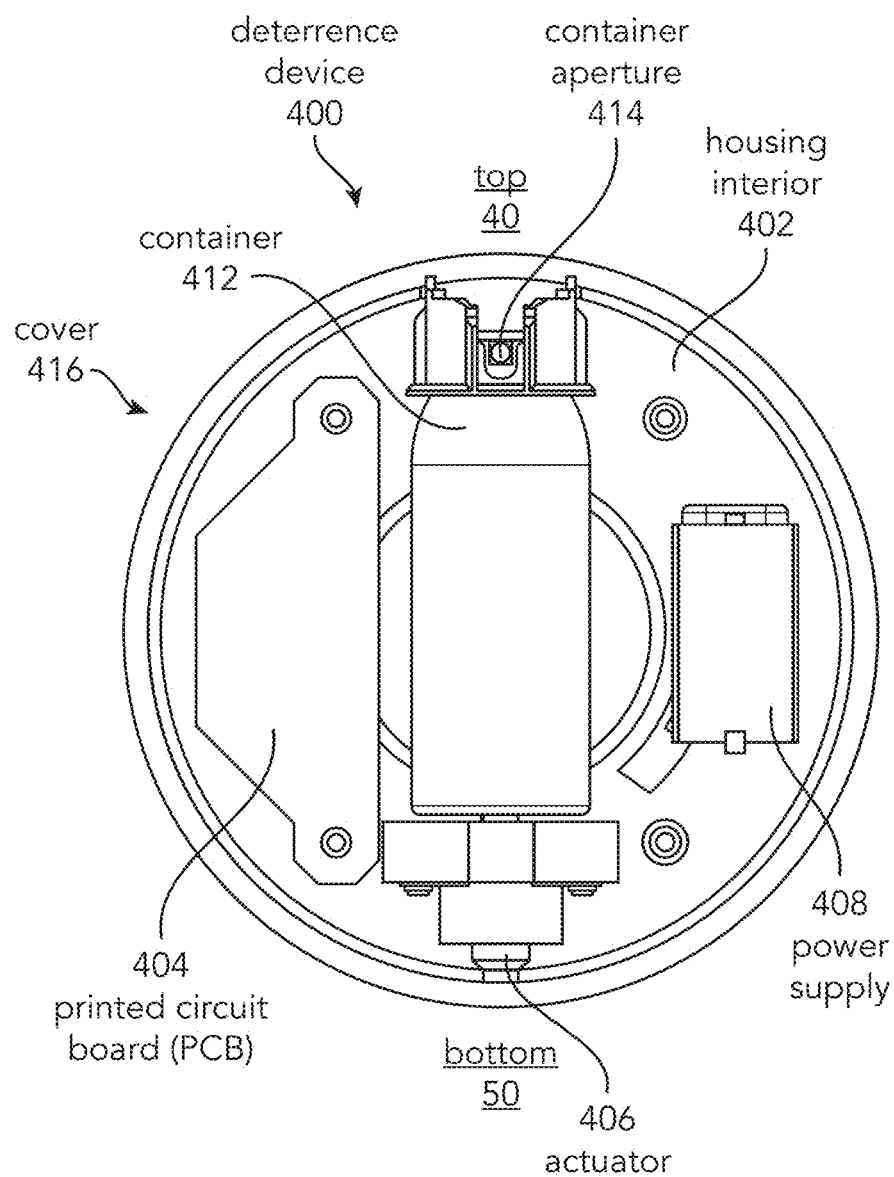
FIG. 4B illustrates an additional back view of an interior of the deterrence device of FIG. 3, according to some embodiments.

FIG. 4A illustrates a back view of an interior of a deterrence device 400, according to some embodiments. The overall function between deterrence device 400 and deterrence device 20 may be similar, with differences being, for example, location of certain components, such as housing opening 410. The base is removed from the cover 416 in this figure, thereby exposing the interior of the cover 416. As shown in FIG. 4A, the housing of the deterrence device 400 includes a housing interior 402—that is, an interior compartment of the housing in which different components and necessary electronics may be stored. In some embodiments, the deterrence device 400 includes a printed circuit board (PCB) 404. The PCB 404 may be electrically and/or communicatively coupled to any present LED (such as LED(s) 204 as shown and described in FIG. 2 above), any present speaker (such as speaker 206 as shown and described in FIG. 2 above), any present camera and/or microphone (such as camera microphone 210 as shown and described above), any present motor (such as the motor 512 as shown and described in FIGS. 5A and 5B above, the motor 608a as shown and described in FIG. 6A above, and/or the motor 608b as shown and described in FIG. 6B below).

The PCB 404 may also be electrically and/or communicatively coupled to an actuator 406, located near the bottom 50 of the deterrence device. In some embodiments, the actuator 406 is capable of mechanically and/or electrically interacting with a container (as described herein) in order to cause the container to expel its contents. By way of example, the actuator 406 may be capable of exerting up to five pounds of pressure in order to move the container and/or a nozzle of the container about 2.5 millimeters (mm).

Also shown in FIG. 4A is a power supply 408. While FIG. 4A illustrates a power supply 408, it is understood that an external power source may also be used, either directly or indirectly electrically coupled to the deterrence device 400. In some embodiments, the power supply 408 is configured to provide power to any present LED(s) 204, speaker 206, motor (as described herein), and/or actuator 406. According to some embodiments, the power supply 408 is a battery. Specifically, the power supply 408 may be a Lithium-Ion battery, including for example, a three amp-hour (Ah) Lithium-Ion battery.

Additionally, or alternatively, a solar panel may be coupled to the housing of the deterrence device 400. In examples where the deterrence device 400 is coupled to the building 10 outdoors, the solar panel may recharge and/or provide power to the power supply 408.

FIG. 4A also illustrates a housing opening 410 (similar to the housing opening 208 as shown and described in FIG. 2 above) located near the top 40, from inside the housing interior 402. This opening 410 may fluidly couple the container (as will be explored below in FIG. 4B) to the exterior of the deterrence device 400.

FIG. 4B illustrates an additional back view of an interior of the deterrence device 400 of FIG. 4A, according to some embodiments. The base is removed from the cover 416 in this figure, thereby exposing the interior. Still shown in FIG. 4B and having much the same purposes as those described in FIG. 4A are a PCB 404, actuator 406 located near the bottom 50, and power supply 408 housed within the housing interior 402.

In FIG. 4B, a container 412 is shown inserted into the deterrence device 400 (e.g., within the interior of the housing). This container 412, may include a container aperture 414 located near the top 40 permitting a fluid coupling between the container 412 and the housing opening 410, for allowing the contents of the container 412 to egress the deterrence device 400. The contents of such a container 412 may include an aerosol (such as the contents 302 as shown and described in FIG. 3 above). When the actuator 406 is actuated, the container 412 may release its contents (the aerosol) through the container aperture 414, through the housing opening 410, and into the vicinity around the deterrence device 400.

Figure 5A:
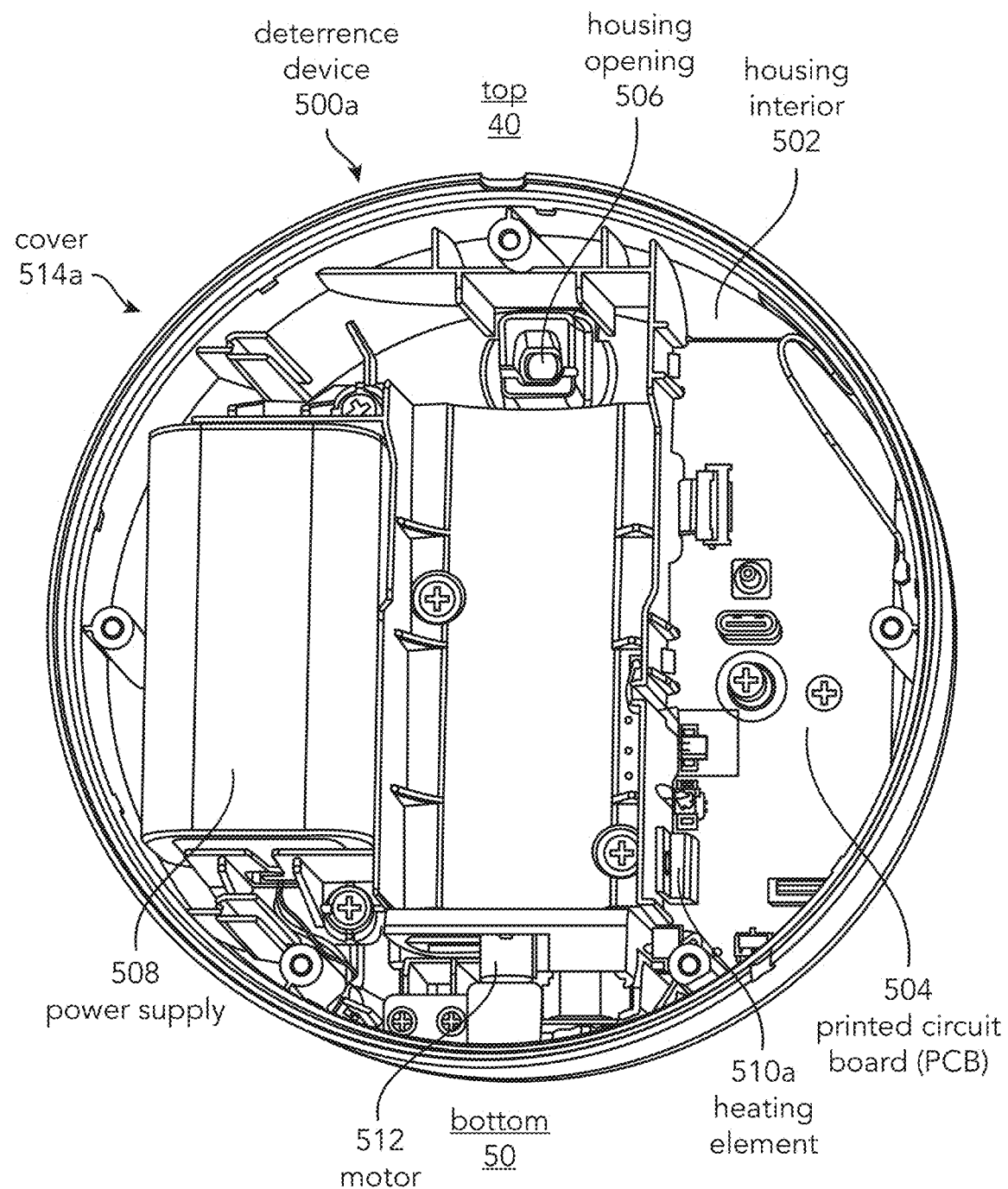
FIG. 5A illustrates a back view of an interior of a deterrence device including a heating element, according to some embodiments.
Figure 5B:
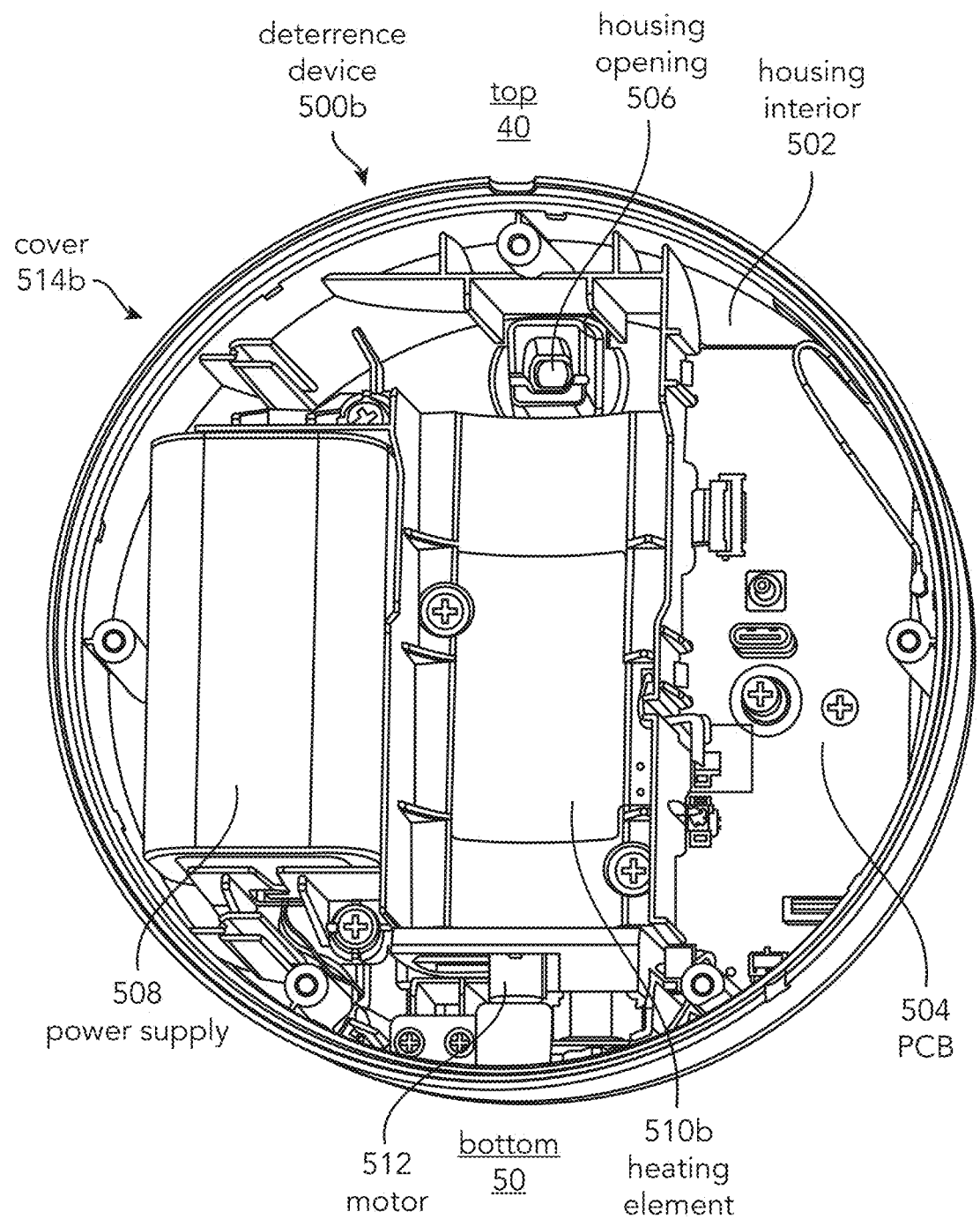
FIG. 5B illustrates a back view of an interior of a deterrence device having another heating element, according to some embodiments.

The container 412 may release all of its contents when the actuator 406 is actuated. In alternative embodiments, the container may only release a percentage of its contents, such as 50% of its contents, so that multiple sprays of aerosol from the container may occur before the need to change the container for a new one. In additional alternative embodiments, the deterrence device 400 does not include a container but rather a refillable reservoir so the user can add additional aerosol or fluid to be aerosolized under pressure. According to some embodiments, the capacity of the container may be between about 1 ounce (oz) to about 40 oz FIG. 5A illustrates a back view of an interior of a deterrence device 500a including a heating element 510a, according to some embodiments. The base is removed from the cover 514a in this figure, thereby exposing the interior of the cover 514a. The overall function between deterrence device 500a, deterrence device 400, deterrence device 20 may be similar, with differences being, for example, location of certain components, such as the housing opening 506. As shown in FIG. 5A, the deterrence device 500a includes a housing interior 502 including a housing opening 506 near the top 40 for permitting contents of any present container to escape from the deterrence device 500a. Also seen inside the housing interior 502 is a power supply 508 and a PCB 504 electrically and/or communicatively coupled to multiple other components within the housing interior 502. The power supply 508 and PCB 504 may also be coupled to one another.

Near the bottom 50 of the housing interior 502, a motor 512 is shown. The motor may interact with an actuator (such as the actuator 406 as shown and described in FIGS. 4A and 4B above), or with a container directly in order to cause the container to expel (e.g. discharge) its contents. The motor 512 may be coupled to the power supply 508, the PCB 504, or both.

The deterrence device may include a heating element 510a. The heating element 510a, as shown, may be a metal oxide semiconductor (MOS) heater. The heating element 510a may be coupled to the power supply 508, the PCB 504, or both. The heating element 510a may serve to keep the contents of any present container at an optimal temperature for fluidity and dispersion upon egress from the deterrence device 500a without exceeding a high temperature that could pose a hazard (e.g., not above fifty degrees centigrade). By way of example, if the temperature reaches zero degrees centigrade, the heater may turn on to prevent the internal components of the deterrence device 500a from becoming too cold. In other embodiments, if the temperature reaches sub-optimal temperatures, such as negative ten degrees centigrade, negative twenty degrees centigrade, or lower, the heating plate 510 will be activated. The heating plate 510 may include a sensor to detect a temperature within the interior of the housing. Heating element 510a may be present on a side of the interior portion of the housing where a container may be placed.

Additionally, or alternatively, a solar panel may be coupled to the housing of the deterrence device 500*a*. In examples where the deterrence device 500*a* is coupled to the building 10 outdoors, the solar panel may recharge and/or provide power to the power supply 508.

FIG. 5B illustrates a back view of an interior of a deterrence device 500*b* having another heating element 510*b*, according to some embodiments. The base is removed from the cover 514*b* in this figure, thereby exposing the interior of the cover. Deterrence device 500*b* also includes a housing interior 502 with a housing opening 506 located near the top 40, as well as a PCB 504, power supply 508, and motor 512 located near the bottom 50. The interactions between these components may be the same as those described and shown above in FIG. 5A.

However, in deterrence device 500*b*, heating element 510*b* is shown inside the cavity where a container may be placed. This heating element 510*b* may be a flat plate collector (FPC) heating plate. Heating element 510*b* may be coupled to the power supply 508, the PCB 504, or both. Heating elements 510*b* may also serve to keep the contents of any present container at an optimal temperature for fluidity and dispersion upon egress from the deterrence device 500*b* without exceeding a high temperature that could pose a hazard (e.g., not above fifty degrees centigrade). By way of example, if the temperature reaches zero degrees centigrade, the heater may turn on to prevent the internal components of the deterrence device 500*b* from becoming too cold. In other embodiments, if the temperature reaches sub-optimal temperatures, such as negative ten degrees centigrade, negative twenty degrees centigrade, or lower, the heating plate 510 will be activated. The heating plate 510 may include a sensor to detect a temperature within the interior of the housing.

Additionally, or alternatively, a solar panel may be coupled to the housing of the deterrence device 500*b*. In examples where the deterrence device 500*b* is coupled to the building 10 outdoors, the solar panel may recharge and/or provide power to the power supply 508. In some embodiments, the device may be powered constantly, such as via an alternating current (AC) outlet electrically coupled to the building on which the device is placed. Additionally, or alternatively, a heating pad may be included in or on the device, either alone or in combination with the heating plates as detailed above.

FIG. 6A illustrates a side view of a cross-section of a deterrence device 600*a* including a cover 610*a* and a base 612*a*, according to some embodiments. The base 612*a* may be the component that attaches to a surface of a building 10. In FIG. 6A, a container 602*a* is present. The container 602*a* may include a container body 620*a* that defines a reservoir containing the contents of the container. The container 602*a* may further include a cap 618*a* that is mechanically coupled to the container body 620*a*. The cap 618*a* may be located near the top 40 of the deterrence device 600*a*. The container 602*a* may further include a valve stem 616*a*. The valve stem 616*a* may be configured to access a reservoir of the container 602*a* (e.g., via actuation by the actuator, as described herein), so as to fluidly couple the container 602*a* to the exterior of the deterrence device 600*a* (e.g., via housing opening 606). In some embodiments, the container 602*a* is fluidly coupled to the exterior of the deterrence device 600*a* by way of the nozzle 604*a* and the housing opening 606, and at least partially by way of the valve stem 616*a*.

In some embodiments, the container aperture (e.g., 414) is on the container body, and/or includes the valve stem 616*a*, wherein the nozzle 604*a* is in fluidic communication with the container aperture and/or valve stem 616*a*. In some embodiments, the nozzle 604*a* may be, or may have, an aperture, such as the container aperture 414 as shown and described in FIG. 4B above. For example, the nozzle 604*a* may include an outlet opening that may be the aperture and/or may be in fluidic communication with the aperture. The outlet opening of the nozzle 604*a* may be aligned with the housing opening 606.

The nozzle 604*a* is shown oriented in an at least partially downward angle directed away from the top 40. Benefits of such an angle include permitting the cap 618*a* to be located closer to the top 40, thereby making more room for the container 602*a*, and/or increasing the possible volume of the contents (e.g., aerosol) that may be provided in the container 602*a*. Additionally, due to the nozzle 604*a* facing partially downward, any emitted aerosol would be directed more directly toward the targeted individual and the spray pattern would increase in radius, effecting a greater area.

As described herein, the deterrence device 600*a* may include a motor 608*a*, configured to actuate the actuator. The actuator, may be configured to discharge the contents from the reservoir within the container 602*a*. In some embodiments, the actuator is configured to enable the valve stem 616*a* to access the reservoir, thereby fluidly coupling the reservoir with the housing opening 606, so as to discharge the contents to an area exterior the deterrence device 600*a*. The reservoir may be fluidly coupled with the housing opening 606 via the nozzle 604*a*. In some embodiments, the actuator is configured to move the container body 620*a* and/or valve stem 616*a* between a first position and a second position, wherein in the first position, the contents within the reservoir are fluidly isolated from the valve stem 616*a* and/or housing opening 606, whereas in the second position, the valve stem 616a fluidly couples the contents within the reservoir with the housing opening 606.

At the bottom 50 of the deterrence device 600a, a motor 608a is shown. Benefits of placing the motor 608a in the bottom 50 of the deterrence device 600a include increasing the push limit of the motor, meaning there is a lower power draw on the power supply. Additionally, the motor 608a better equalizes the container from this position. In some embodiments, when the deterrence device 600a is activated to spray the aerosol from the container 602a, the motor 608a will cause the actuator 614a to move upward, applying pressure to the container 602a, and thereby moving the container body 620a upwards. As pressure is applied to the container body 620a, the cap 618a is held in place by the housing of the deterrence device 600a. The container body 620a transfers at least part of this pressure to the valve stem 616a, causing the valve stem 616a to at least partially access the reservoir. The contents (e.g., aerosol), which is itself pressurized within the container 602a, is then released from the container 602a through the valve stem 616a, through the nozzle 604a, and out of the housing opening 606. According to some embodiments, the pressure may be between about 25 pounds per square inch (PSI) and about 200 PSI.

Additionally, or alternatively, the valve stem 616a may be in constant fluid communication with the contents of the container 602a, but the surrounding pressure is enough to keep the valve stem in a closed state. When the pressure is applied to the container body 620a, pressure is exerted on the valve stem in a direction transverse to the surrounding pressure, causing the valve stem 616a to at least partially open, and allowing the contents to be released from the container 602a through the valve stem 616a, through the nozzle 604a, and out of the housing opening 606.

Also seen in FIG. 6A is a duckbill 622 coupled to the cap 618a. The duckbill 622 may allow a user to more easily remove and/or place containers 602a into the deterrence device 600a, while also at least partially preventing any problems from occurring with respect to handling highly pressurized aerosols and their containers.

FIG. 6B illustrates a side view of a cross-section of another deterrence device 600b including a cover 610b and a base 612b, according to some embodiments. The base 612b may be the component that attaches to a surface of a building 10. In FIG. 6B, a container 602b is present. The container 602b may be similar in function to that of container 602a, with a few exceptions as described herein. The container 602b may include a container body 620b having a reservoir containing the contents, a valve stem 616b, and optionally a cap 618b and a nozzle 604b.

The nozzle 604b may be, or may have, an aperture, such as the container aperture 414 as shown and described in FIG. 4B above. The nozzle 604b is shown oriented in an at least partially upward angle towards the top 40. Benefits of such an angle include lowering the cap 618b with respect to the top 40, thereby decreasing the volume of the container 602b, and thereby decreasing the weight of the container 602b along with its contents. This in turn allows the actuator 614b to apply the necessary pressure to open the valve stem 616b using less force, and therefor, less power provided by any present power supply. According to some embodiments, the pressure may be between about 25 pounds per square inch (PSI) and about 200 PSI.

The motor 608b may be configured to actuate the actuator 614b, similar to the motor 608a in FIG. 6B. The motor 608b is shown disposed near the front of the cover 610b of the deterrence device 600b. When the deterrence device 600b is activated to spray the contents (e.g., aerosol) from the container 602b, the motor 608b will cause the actuator 614b, shown near the bottom 50 of the deterrence device 600b, to move upward, applying pressure to the container body 620b, as similarly described in FIG. 6A.

While not shown in FIGS. 6A and 6B, the nozzle may extend at a right angle to the cap, and not at an upward or downward angle with respect to the top. In such an embodiment, this may serve to find a middle ground between the benefits of the other designs.

As described herein, any deterrence device described herein may be configured to communicate with an external component. The external component may be a remote computing device, which may include any of a smart device, a tablet computer, a personal assistant, a doorbell, and a distributed network of servers. In some embodiments, the device is configured to communicate with the external component via the PCB (as described herein). Alternatively, or additionally, individual components of the deterrence device (e.g., actuator, motor, LED, camera, speaker, microphone, motion detector, etc.) are configured to communicate with the external component. In some embodiments, the device (PCB and/or individual components) include a communications chip configured to communicate with the external component.

In some embodiments, the external component is configured to provide instructions to the PCB and/or individual components to initiate and/or control an action. In some embodiments, the action includes discharging the contents from the container to the area surrounding the exterior of the deterrence device, capturing an image via the camera, recording a sound via the microphone, emitting a noise via the speaker, emitting a light via the LED, or any combination thereof. The external component may be configured to selectively and/or simultaneously initiate and/or control an action described herein. This includes the external component being configured to sequentially initiate and/or control an action of a component of the deterrence device.

In some embodiments, the external component is configured to receive an alert from any deterrence device described herein, wherein the alert may correspond to an intruder or dangerous or unwanted animal about a building. In response to the alert, the external component may be configured to activate a deterrence measure via the deterrence device. The deterrence measure may include discharging the contents from within the container to the exterior surrounding the housing, emitting light from the LED, emitting noise from the speaker, capturing image via the camera, or any combination thereof.

The alert may include light being emitted from the LED, sound received by the microphone, movement captured by the motion detector, image captured by the camera, or any combination thereof. In some embodiments, the external component is configured to automatically activate the deterrence measure, which may include the use of, for example, a machine learning algorithm. Alternatively or additionally, the external component may be configured to activate the deterrence measure based on a user input. For example, the user may be prompted via the external component, upon receiving an alert, to activate a deterrence measure.

Figure 7:
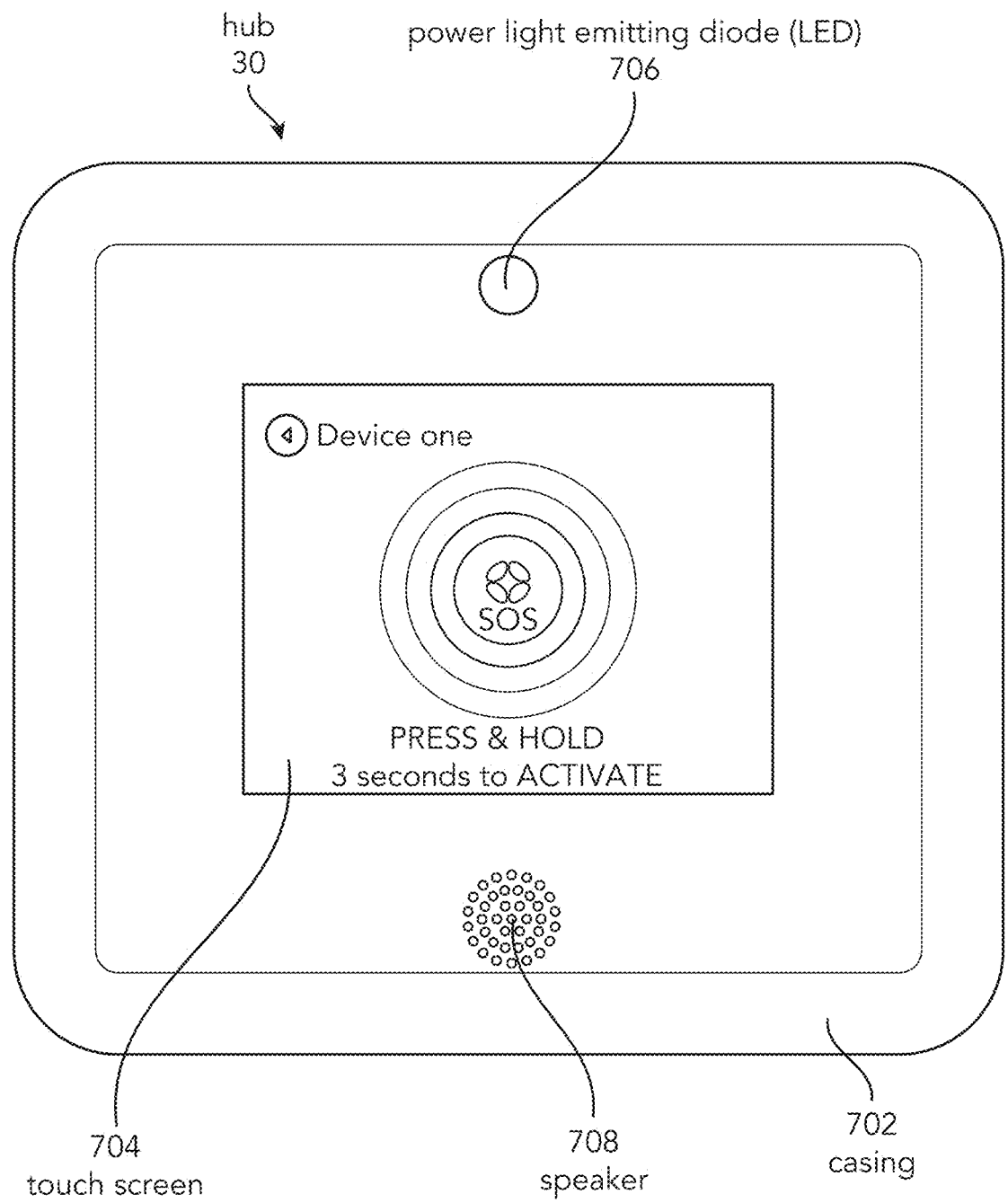
FIG. 7 illustrates a front view of a hub, according to some embodiments.
Figure 8:
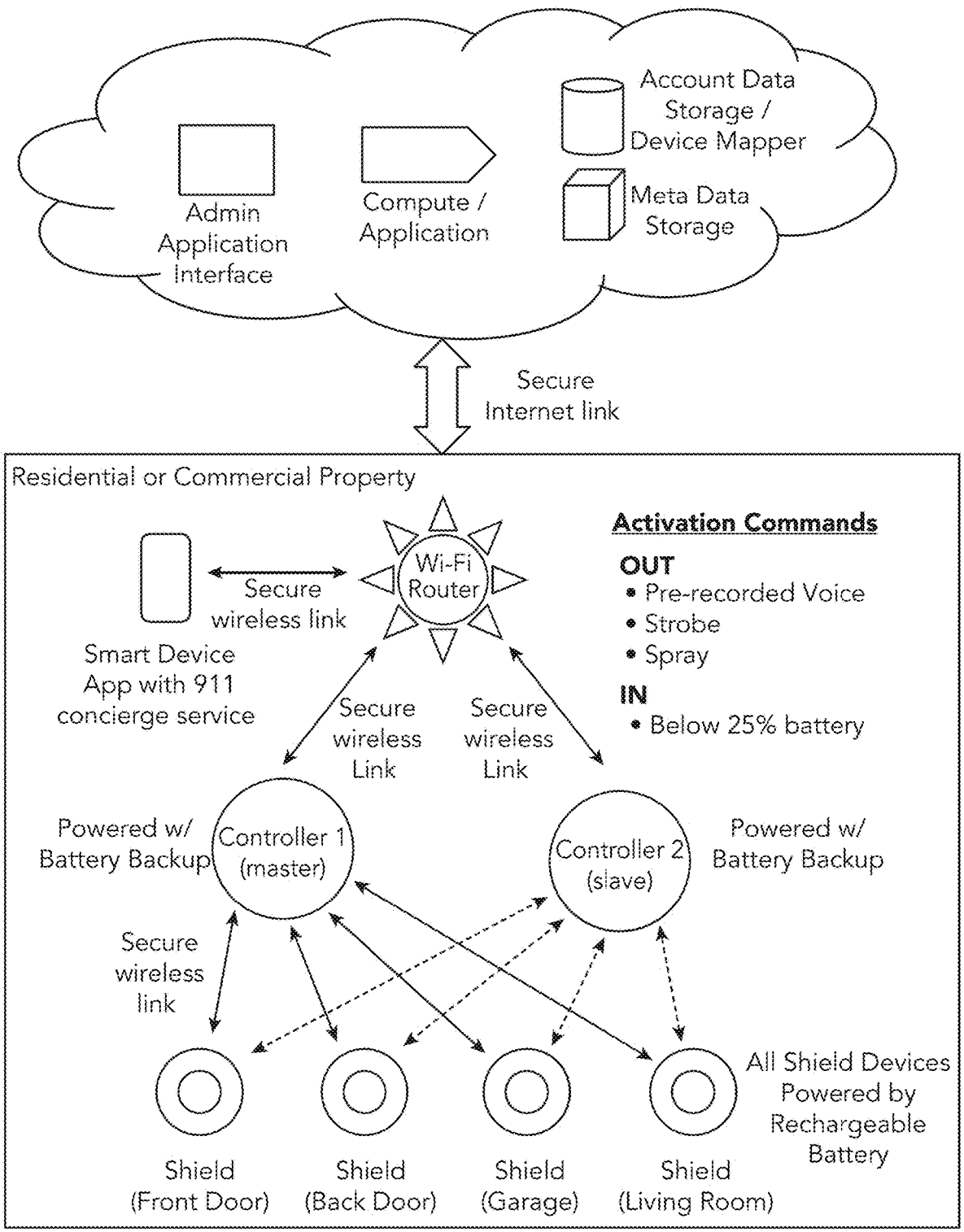
FIG. 8 illustrates a block diagram depicting multiple deterrence devices, according to some embodiments.
Figure 9:
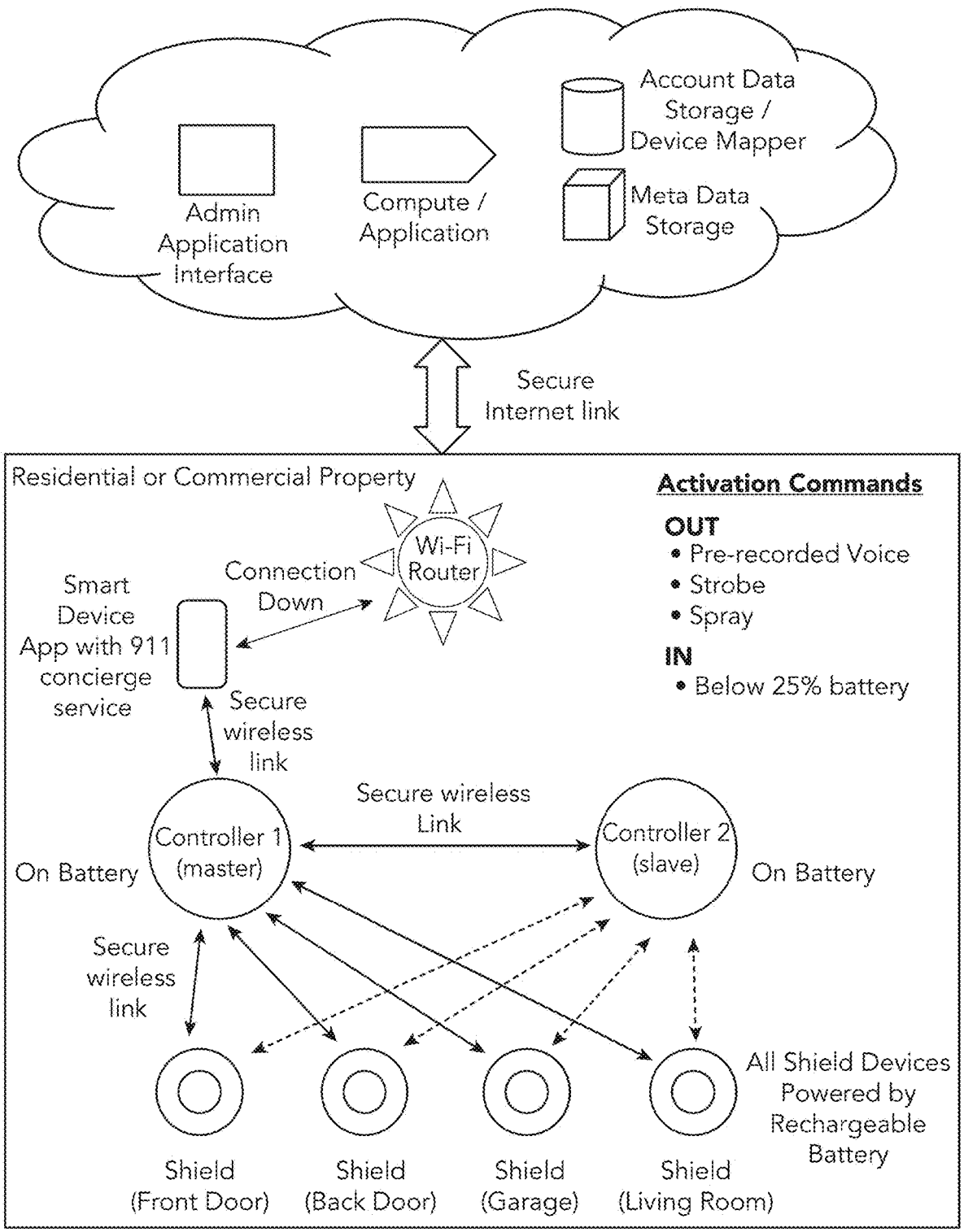
FIG. 9 illustrates another block diagram depicting multiple deterrence devices, according to some embodiments.
Figure 10:
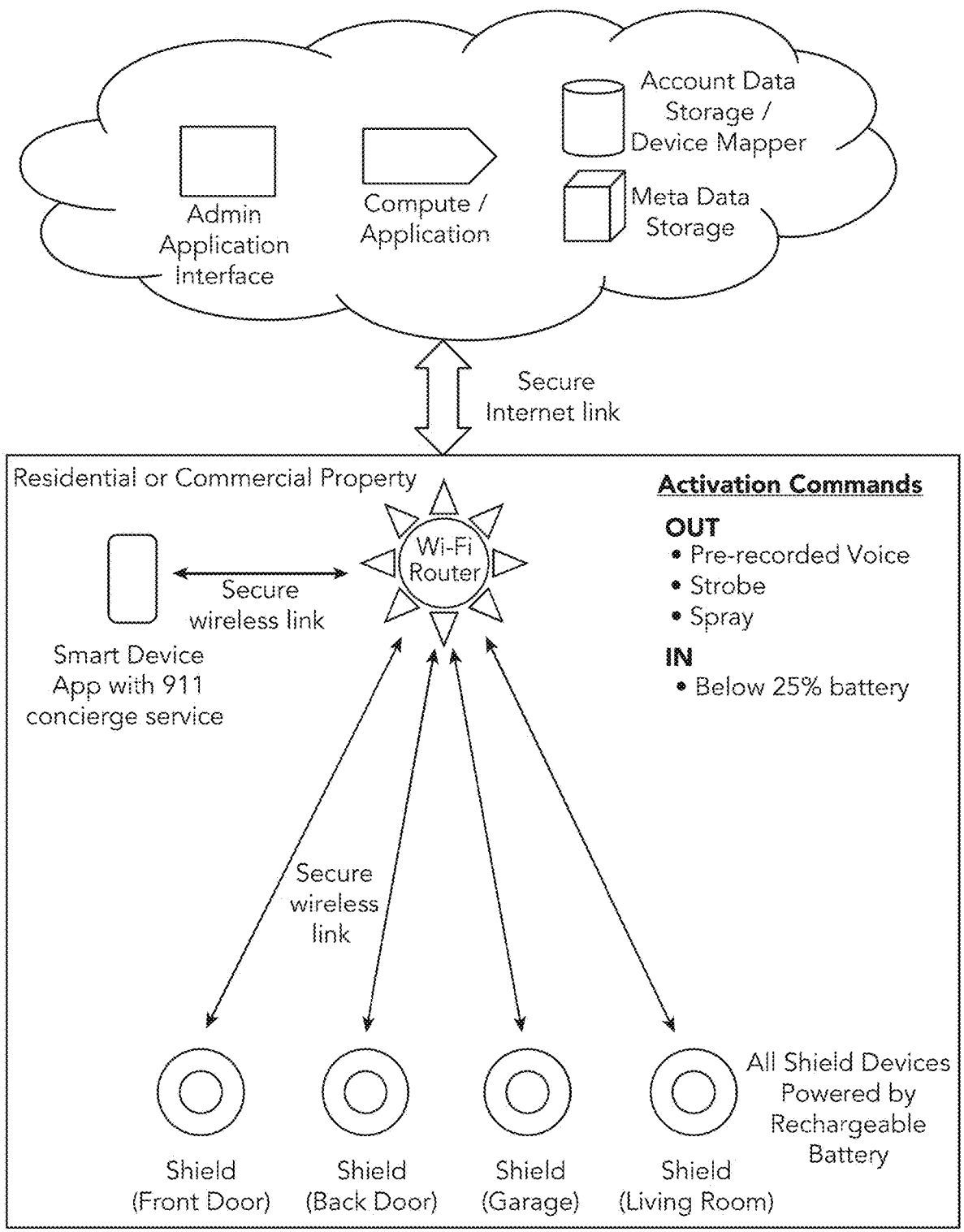
FIG. 10 illustrates a block diagram depicting multiple hubs coupled to multiple deterrence devices, according to some embodiments.
Figure 11:
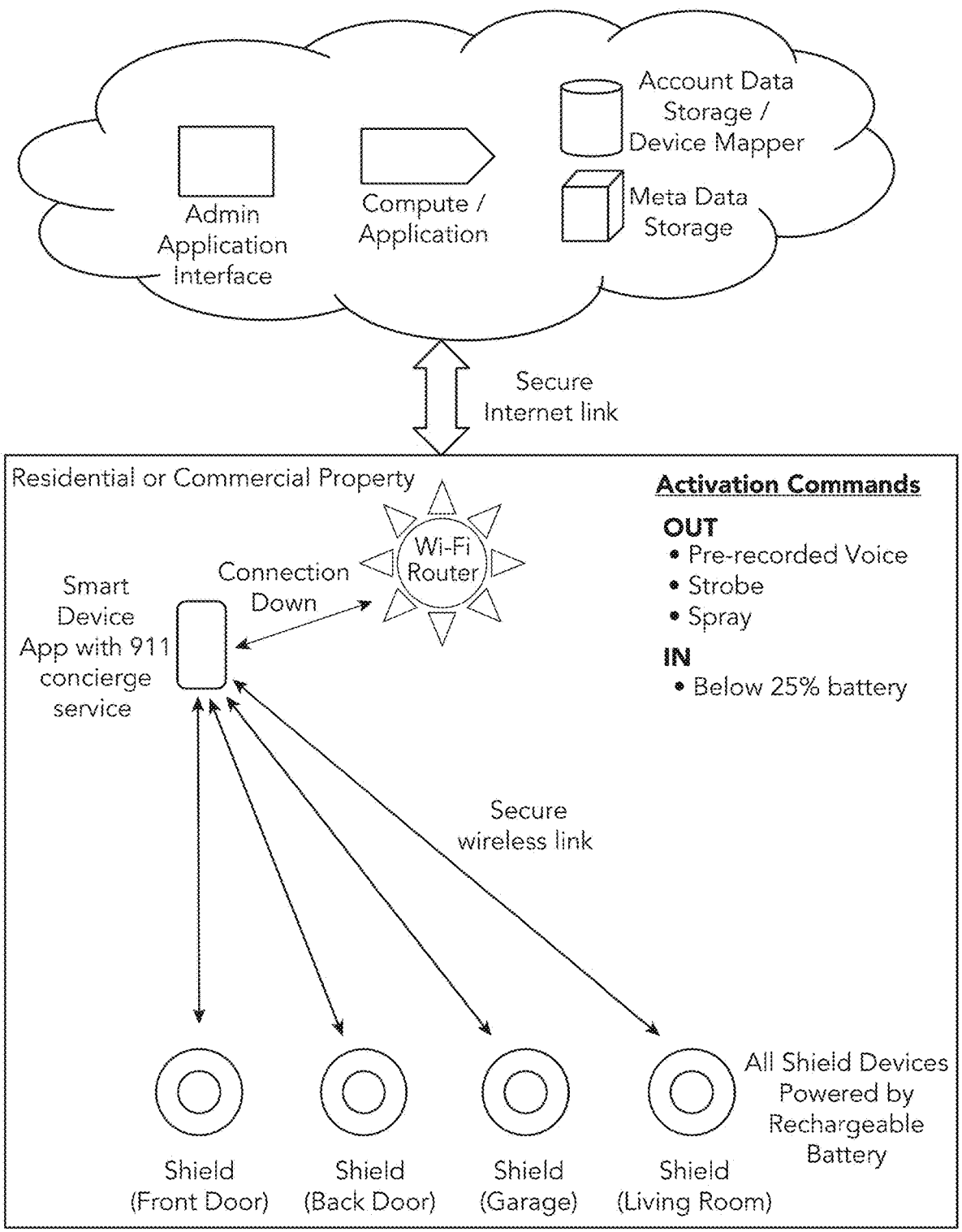
FIG. 11 illustrates another block diagram depicting multiple hubs coupled to multiple deterrence devices, according to some embodiments.
Figure 12:
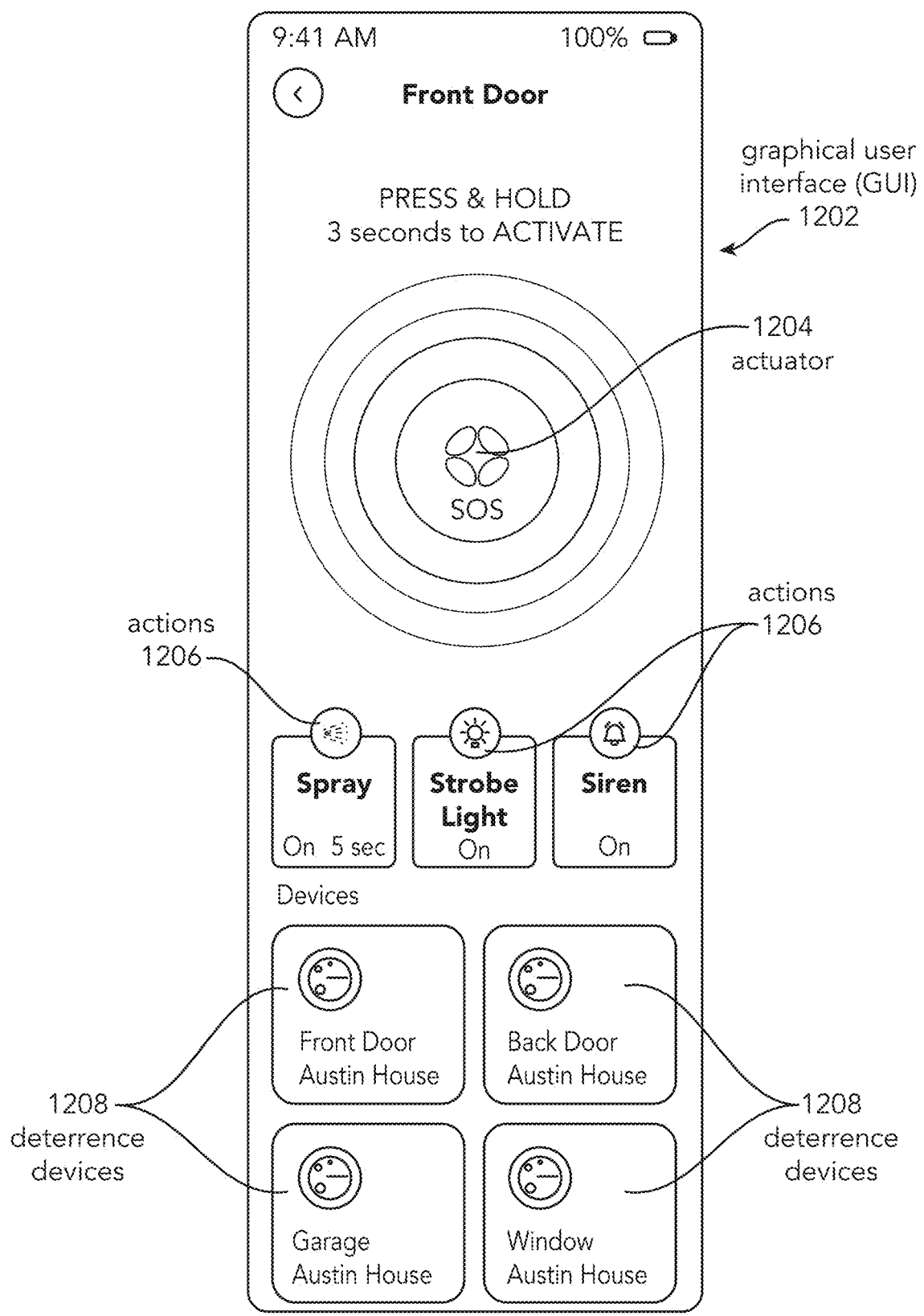
FIG. 12 illustrates a graphical user interface (GUI), according to some embodiments.

As described herein, the external component (hub) may include a remote computing device, including a smart device. FIG. 7 illustrates a front view of a hub 30, according to some embodiments. As shown in FIG. 7, the hub 30 includes a casing 702 for holding the contents and/or electronics of the hub 30. The hub may also include a touch screen 704 capable of being interacted with by a user. As described herein, the hub 30 may be communicatively coupled to the deterrence device 20, such that the deterrence device may be activated through interactions with the hub 30.

The hub 30 may be able to control any present LED(s) (such as LED 204 as shown and described in FIG. 2 above), any present speaker (such as the speaker 206 as shown and described in FIG. 2 above), any present camera or microphone (such as camera microphone 210 as shown and described in FIG. 2 above), any present actuator (such as the actuator 406 as shown and described in FIGS. 4A and 4B above), and/or any present motor (such as the motor 512 as shown and described in FIGS. 5A and 5B above, the motor 608a as shown and described in FIG. 6A above, and/or the motor 608b as shown and described in FIG. 6B above), either individually or simultaneously. A user may also pre-program a sequence of activations for these components including setting a delay between actions in order to permit an intruder to leave prior to escalating the deterring effects.

Also shown in FIG. 7 is a power LED 706. The power LED 706 may indicate that the hub 30 has power. The power LED 706 may also indicate that the hub 30 is running out of power through dimming, changing color, or blinking. In some embodiments, the hub 30 does not include a power LED 706, and instead, the touch screen 704 may indicate a power level, or lack thereof, through dimming or flashing.

As described herein, the hub 30 may also provide information to the user. For example, the hub 30 may convey any and all information gathered by any present camera, microphone, or motion detector, along with information associated with this gathered data in combination with any databases being used or AI detection. The hub 30 may also be capable of informing a user when the space (e.g., area exterior to the deterrence device) is clear (aerosol has dissipated/deteriorated enough to be safe) after an emission of the aerosol. This may occur through a preprogrammed timer with respect to an estimated time of dispersion. This may also occur through an integrated sensor capable of monitoring the percent composition of the ambient air that is still made of the aerosol's chemical composition, such as by way of parts per million (PPM).

As described herein, the features provided by the hub 30 may also be integrated into a remote computing device (e.g., a smart device, a phone, a tablet, a laptop, etc.). This may permit a user to forego the use of a dedicated hub 30 in favor of using a device they already have at hand. The features may be provided via a non-transitory, computer-readable media executable by a processor of a computing device as well, permitting the code needed to run the features of the hub 30 to be integrated into computing devices at need.

FIG. 8 illustrates a block diagram depicting multiple hubs coupled to multiple deterrence devices (e.g., any deterrence device described herein), according to some embodiments. Specifically, FIG. 8 illustrates two controllers (also referred to as hubs 30) communicatively coupled to multiple shields (also referred to as deterrence device 20). In this example, four shields are illustrated. In other embodiments, as few or as many shields as desired may be implemented. Additionally, only two controllers are shown in this embodiment. In additional embodiments, as few or as many controllers as desired may be implemented.

In FIG. 8, one controller acts as a master, while the other controller acts as slaves-meaning the first controller (master) is directly interacted with by a user, while the second controller may receive and duplicate the instructions given to the first controller. As shown, both controllers are communicatively coupled to all shields. In additional embodiments, the controllers are communicatively coupled to distinct shields. In still additional embodiments, the controllers are communicatively coupled to some, but not all, of the shields, and overlap in communication between the controllers and some of the shields is permitted. This communicative coupling may be through a secure wireless link.

A user may interact directly with the controller, or with a remote computing device, such as the smart device as shown. In the example of using a remote computing device, the user may communicate with the controllers by way of a wireless fidelity (Wi-Fi) router. In this way, a user can control the entire system over Wi-Fi.

Also shown in FIG. 8 are possible commands to and from the system. The system may output a pre-recorded voice through the speaker, strobing lights through the LEDs, and discharge the contents from the container. The shields or controllers may inform a user through their remote computing device that power levels are low, such as below 25%.

FIG. 9 illustrates another block diagram depicting multiple hubs coupled to multiple deterrence devices, according to some embodiments. As shown in FIG. 9, there may be times when the Wi-Fi router cannot be accessed-either the internet is down, or reception in the area is not great, etc. In such instances, a user may communicate with a controller via their remote computing device (e.g., a mobile phone or other wired, or wireless, device, etc.) through a short-range communications network, such as Bluetooth. The user would need only communicate with the master controller, as the slave controller may be wirelessly communicatively coupled in the same manner to the master controller in order to receive instructions.

FIG. 10 illustrates a block diagram depicting multiple deterrence devices, according to some embodiments. Specifically, FIG. 10 as illustrated removes the controllers from FIG. 8, instead permitting the user to directly interact with each shield through a Wi-Fi connection on a remote computing device. In such embodiments, the user may individually control each shield with their remote computing device.

FIG. 11 illustrates another block diagram depicting multiple deterrence devices, according to some embodiments. Similar to FIG. 9 above, this embodiment shows a Wi-Fi connection being unattainable. In such cases, the user may communicate with each included shield through a short-range communications network, such as Bluetooth. In this embodiment, the user may be able to independently communicate with and control each shield.

In each of the illustrations depicted in FIGS. 8-11, the external component (hub, controller) may be communicatively coupled to each of the individual deterrence devices (shields), which may be any deterrence device described herein. The external component may further be configured to independently control, simultaneously control, or both, an action for each of the deterrence devices. For example, upon receiving an alert from a specific location of a building, a user may be able to selectively discharge the contents from the container for the deterrence device(s) located in the closes proximity to said specific location. Similarly, the user may be able to simultaneously discharge the contents from the container for all the deterrence devices.

In some embodiments, the deterrence device includes, or is operatively and communicatively coupled with, a computational module. The computational module may be capable of causing the deterrence device to perform actions (e.g., emitting sound, flashing lights, emitting aerosol, etc.) without receiving inputs from a user.

The computational module may be capable of being trained, i.e., learning from the user. For example, if an animal, such as a bear, approaches the user's house, the user may choose to take softer actions at first before releasing the aerosol (e.g., contents from the deterrence device). Maybe the user turns on the LEDs and has them strobe for a period of time before adding in a siren from the speaker for a period of time and then releasing the aerosol. In such an example, the computational module may learn this pattern of actions, and should the system as a whole recognize a bear approaching in the future, repeat this sequence of actions.

As another example, the user may react to specific noises reported by the system. Maybe a suspicious noise occurs near their door, and as a preemptive measure they turn on the LEDs as a warning. Even if no further action is taken, the computational module may learn this pattern and recognize the same, or similar, noises and repeat the actions taken by the user. These same processes may occur for motion that is detected, or AI and facial recognition of either individuals or objects associated with the individuals.

In some embodiments, the computational module, via for example the camera, may be configured to identify if a dangerous object, such as a weapon (e.g., gun, knife) is present with an individual, and thereby automatically discharge the contents from the container from a deterrence device.

FIG. 12 illustrates a graphical user interface (GUI) 1202, according to some embodiments. The GUI 1202 may be capable of being presented on the hub 30, or a remote computing device accessible by a user. In some embodiments, the GUI 1202 includes an actuator 1204 for causing any communicatively coupled deterrence devices 1208 to perform actions 1206. Actions 1206 shown on the GUI 1202 include discharging the contents from the deterrence device, strobing a light, and sounding a siren. As can be seen on the spraying action 1206, a timer may also be present. This time may also be present on the strobing a light and sounding a siren actions 1206, allowing the user to customize their choice of deterrence.

Also seen in FIG. 12 are multiple deterrence devices 1208. These deterrence devices 1208 may be any of the deterrence devices 20, 400, 500*a*, 500*b*, 600*a*, and/or 600*b* as detailed throughout the disclosure above. A user may be able to change which deterrence device 1208 they are currently interacting with and/or sending instructions to. In this way, the user may be able to isolate the deterrence to a specific location within their building, or, even a location in a different building that has a deterrence device in it. The user may also be able to select multiple deterrence devices 1208 in order to maximize coverage. This may be useful in instances where a group of people are trying to break into a building from multiple points of entry, so that the user does not need to individually set off each distinct deterrence device 1208.

Some of the components listed herein use the same number from figure to figure. It should be appreciated these components use the same numbers solely for ease of reference and to facilitate comprehension for the reader. While these components may use the same numbers, differences may be present in these components as illustrated in the various figures in which they appear and as described in the specification herein.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The foregoing may be accomplished through software code running in one or more processors on a communication device in conjunction with a processor in a server running complementary software code.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It is appreciated that in order to practice the method of the foregoing as described above, it is not necessary that the processors and/or the memories of the processing machine be physically located in the same geographical place. That is, each of the processors and the memory (or memories) used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the foregoing, be performed by a single component. Further, the processing performed by one distinct component as described above may be performed by two distinct components. In a similar manner, the memory storage performed by two distinct memory portions, as described above, may, in accordance with a further embodiment of the foregoing, be performed by a single memory portion. Further, the memory storage, performed by one distinct memory portion, as described above, may be performed by two memory portions.

Further, various technologies may be used to provide communication between the various processors and/or memories, as well as to allow the processors and/or the memories of the foregoing to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software may instruct the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the foregoing. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the foregoing may utilize any compression or encryption technique or algorithm, as may be desired. An encryption module might be used to encrypt data. Further, files or other data may be decrypted using a suitable decryption module, for example.

As described above, the foregoing may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the foregoing may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the foregoing.

Further, the memory or memories used in the processing machine that implements the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the foregoing, a variety of "user interfaces" may be utilized to allow a user to interface with the processing machine or machines that are used to implement the foregoing. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the foregoing, it is not necessary that a human user actually interact with a user interface used by the processing machine of the foregoing. Rather, it is also contemplated that the user interface of the foregoing might interact, i.e., convey and receive information, with another processing machine, rather than a human user. Accordingly, the other processing machine might be characterized as a user. Further, it is contemplated that a user interface utilized in the system and method of the foregoing may interact partially with another processing machine or processing machines, while also interacting partially with a human user.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

We claim:

1. A device, comprising:
   a housing configured to detachably couple to a surface of a building, the housing including an interior portion therewithin;
   a container housed within the interior portion of the housing, the container having a container body defining a reservoir therewithin, the reservoir containing contents therewithin; and
   a valve stem fluidly coupled with an aperture of the container,
   wherein the device is configured to discharge the contents from within the container to an area exterior to the housing, via an opening in the housing,
   wherein the valve stem, the container body, or both, is configured to move between a first position and a second position,
   wherein in the first position the reservoir is fluidly isolated from the opening of the housing, and
   wherein in the second position the valve stem fluidly couples the reservoir with the opening of the housing.

2. The device of claim 1, further comprising an actuator configured to discharge the contents from within the container to the opening of the housing via the aperture of the container.

3. The device of claim 2, wherein the actuator is configured to interact with the container mechanically, electrically, or both, to discharge the contents from within the container.

4. The device of claim 2, further comprising a motor configured to move the actuator to enable mechanical interaction between the actuator and the container.

5. The device of claim 2, wherein the aperture of the container is aligned with the opening of the housing.

6. The device of claim 1, wherein the reservoir has a capacity from about 1 ounce (oz) to about 40 oz.

7. The device of claim 1, wherein the container further comprises a nozzle extending to the opening of the housing, the nozzle having an outlet opening aligned with the opening of the housing, such that the contents are configured to pass through the nozzle from the reservoir to the opening of the housing.

8. The device of claim 7, wherein the aperture is disposed on the container body and spaced from the opening of the housing, such that the nozzle extends substantially between the aperture and the opening of the housing.

9. The device of claim 7, wherein the nozzle comprises the aperture.

10. The device of claim 9, wherein the outlet opening of the nozzle is the aperture.

11. The device of claim 2, wherein the valve stem, the container body, or both, moves between the first position and the second position via an interaction between the actuator and the container.

12. The device of claim 2, wherein the container further comprises a cap mechanically coupled to the container body, the valve stem at least partially disposed within the cap, the container body, or both.

13. The device of claim 12, wherein the actuator is configured to move the container body towards the cap so as to move the container body from the first position to the second position, thereby fluidly coupling the reservoir with the opening of the housing.

14. The device of claim 2, wherein the container further comprises a lever mechanically coupled to the container body, wherein the actuator is configured to move the lever toward the container body so as to move the valve stem from the first position to the second position, thereby fluidly coupling the reservoir with the opening of the housing.

15. The device of claim 1, wherein the container is pressurized.

16. The device of claim 15, wherein a pressure within the container is from about 25 pounds per square inch (PSI) to about 200 PSI.

17. The device of claim 1, further comprising a pump coupled to the container and configured to dispense contents from the container.

* * * * *